(12) United States Patent
Hill et al.

(10) Patent No.: US 10,572,133 B2
(45) Date of Patent: *Feb. 25, 2020

(54) MIXED ENVIRONMENT DISPLAY OF ATTACHED CONTROL ELEMENTS

(71) Applicant: Microsoft Technology Licensing, LLC, Redmond, WA (US)

(72) Inventors: David M. Hill, Bellevue, WA (US); Andrew William Jean, Seattle, WA (US); Jeffrey J. Evertt, Kirkland, WA (US); Alan M. Jones, Duvall, WA (US); Richard C. Roesler, Sammamish, WA (US); Charles W. Carlson, Bothell, WA (US); Emiko V. Charbonneau, Kirkland, WA (US); James Dack, Seattle, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/995,129

(22) Filed: Jun. 1, 2018

(65) Prior Publication Data

US 2018/0349012 A1 Dec. 6, 2018

Related U.S. Application Data

(63) Continuation of application No. 14/946,688, filed on Nov. 19, 2015, now Pat. No. 10,007,413, which is a (Continued)

(51) Int. Cl.
*G09G 5/00* (2006.01)
*G06F 3/0484* (2013.01)
(Continued)

(52) U.S. Cl.
CPC .......... *G06F 3/04847* (2013.01); *G06F 3/011* (2013.01); *G06F 3/013* (2013.01);
(Continued)

(58) Field of Classification Search
CPC .............................. G06T 19/006; G06T 19/00
(Continued)

(56) References Cited

U.S. PATENT DOCUMENTS

| 8,718,822 B1 * | 5/2014 | Hickman ............... B25J 9/1674 |
| | | 700/214 |
| 9,713,871 B2 | 7/2017 | Hill et al. |

(Continued)

FOREIGN PATENT DOCUMENTS

| CN | 102999160 A | 3/2013 |
| CN | 103091844 A | 5/2013 |
| WO | 2005066744 A1 | 7/2005 |

OTHER PUBLICATIONS

"International Preliminary Report on Patentability Issued in PCT Application No. PCT/US2016/029100", dated Aug. 3, 2017, 8 Pages.

(Continued)

*Primary Examiner* — Jin Ge
(74) *Attorney, Agent, or Firm* — Newport IP, LLC; Scott Y. Shigeta

(57) ABSTRACT

Technologies described herein provide a mixed environment display of attached control elements. The techniques disclosed herein enable users of a first computing device to interact with a remote computing device configured to control an object, such as a light, appliance, or any other suitable object. Configurations disclosed herein enable the first computing device to cause one or more actions, such as a selection of the object or the display of a user interface, by capturing and analyzing input data defining the performance (Continued)

of one or more gestures, such as a user looking at the object controlled by the second computing device. Rendered graphical elements configured to enable the control of the object can be displayed with a real-world view of the object.

20 Claims, 16 Drawing Sheets

Related U.S. Application Data continuation-in-part of application No. 14/824,042, filed on Aug. 11, 2015, now abandoned.

(60) Provisional application No. 62/153,460, filed on Apr. 27, 2015.

(51) Int. Cl.
| | |
|---|---|
| *G06F 3/01* | (2006.01) |
| *G06K 9/00* | (2006.01) |
| *G06F 3/0482* | (2013.01) |
| *G06T 19/00* | (2011.01) |

(52) U.S. Cl.
CPC ............ *G06F 3/017* (2013.01); *G06F 3/0482* (2013.01); *G06F 3/04842* (2013.01); *G06K 9/00201* (2013.01); *G06T 19/006* (2013.01); *G06T 2200/24* (2013.01)

(58) Field of Classification Search
USPC ........................................................ 345/633
See application file for complete search history.

(56) References Cited

U.S. PATENT DOCUMENTS

| | | | |
|---|---|---|---|
| 2001/0037163 A1 | 11/2001 | Allard | |
| 2006/0241792 A1* | 10/2006 | Pretlove | G06F 3/011 700/83 |
| 2012/0127284 A1* | 5/2012 | Bar-Zeev | G02B 27/017 348/53 |
| 2013/0073092 A1* | 3/2013 | Hosek | B25J 13/00 700/264 |
| 2014/0325206 A1* | 10/2014 | Kim | H04L 9/0872 713/150 |
| 2016/0311115 A1 | 10/2016 | Hill et al. | |
| 2016/0311116 A1 | 10/2016 | Hill et al. | |
| 2016/0314621 A1 | 10/2016 | Hill et al. | |
| 2017/0297204 A1 | 10/2017 | Hill et al. | |

OTHER PUBLICATIONS

"Non Final Office Action Issued in U.S. Appl. No. 15/642,236", dated Mar. 28, 2019, 14 Pages.

Chong, et al., "Robot programming using augmented reality: An interactive method for planning collision-free paths", In Journal of Robotics and Computer-Integrated Manufacturing, vol. 25, Issue 3, Jun. 2009, 13 Pages.

"Office Action Issued in Chinese Patent Application No. 201680024636.7", dated Dec. 12, 2019, 22 pages.

\* cited by examiner

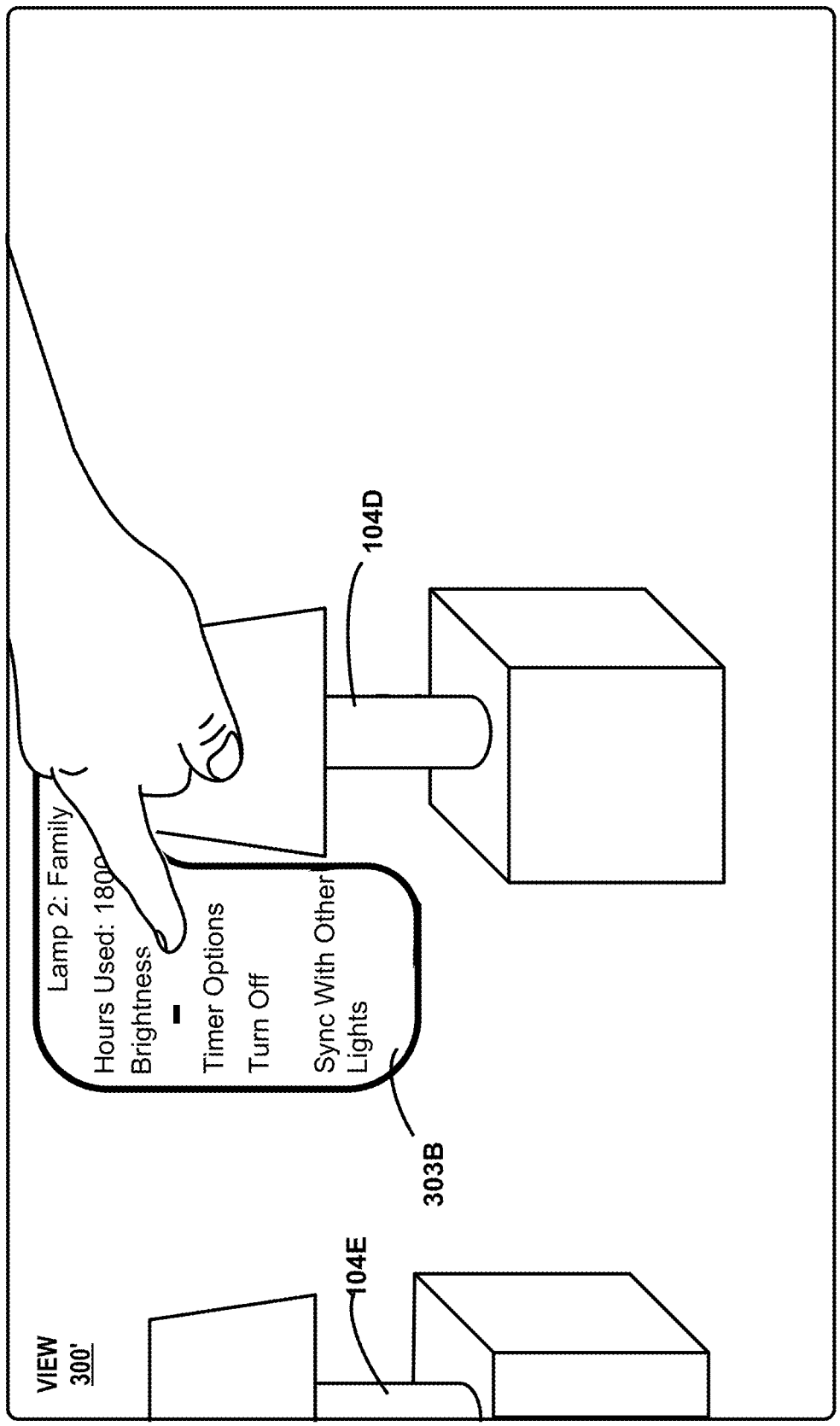

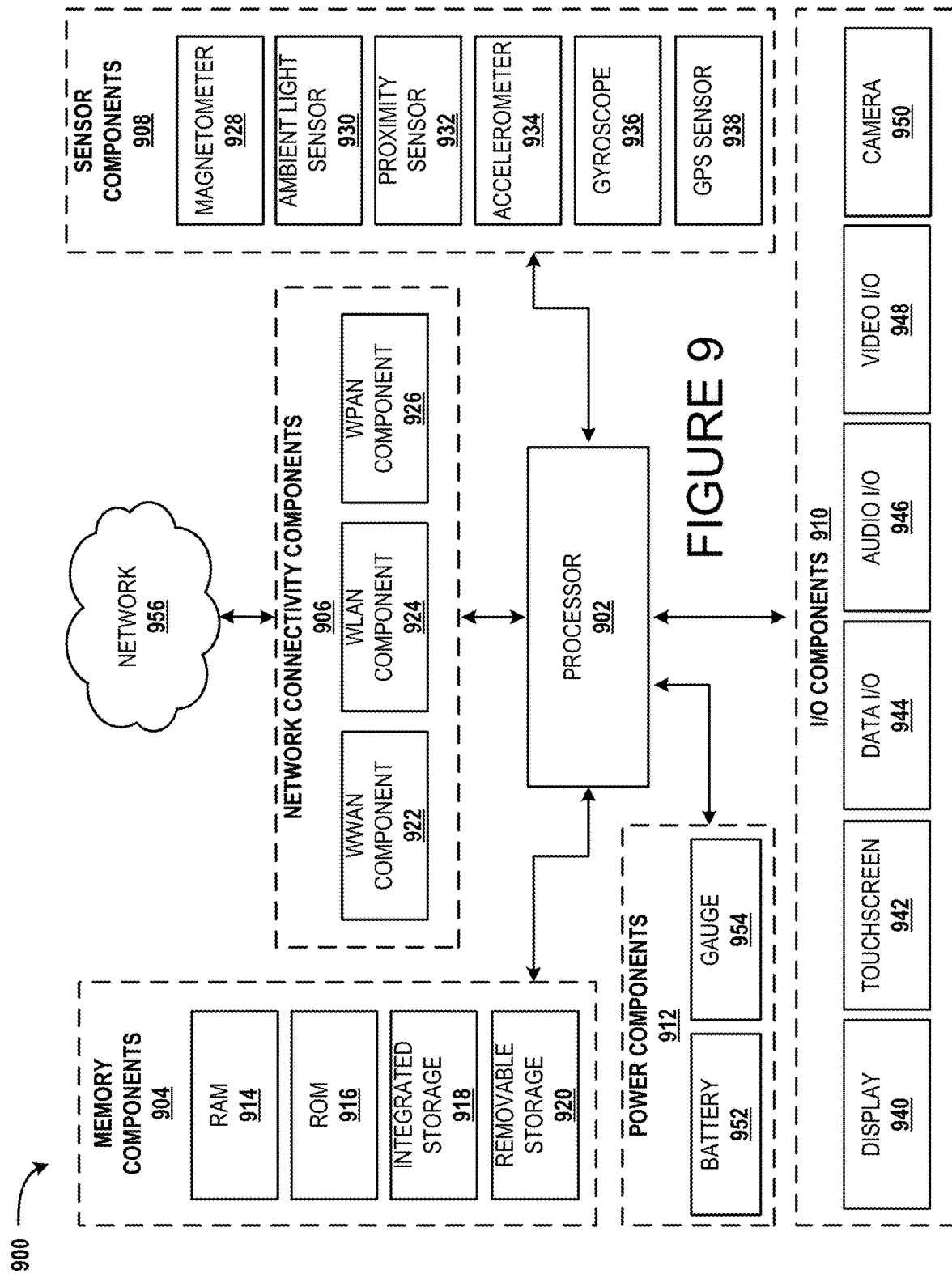

MIXED ENVIRONMENT DISPLAY OF ATTACHED CONTROL ELEMENTS

CROSS REFERENCE TO RELATED APPLICATION

This application is a continuation application of co-pending U.S. application Ser. No. 14/946,688 filed on Nov. 19, 2015 entitled "Mixed Environment Display of Attached Control Elements," which is a continuation-in-part of co-pending U.S. application Ser. No. 14/824,042 filed Aug. 11, 2015 entitled "Mixed Environment Display of Attached Data," which is a non-provisional application of co-pending U.S. Application No. 62/153,460 filed Apr. 27, 2015 entitled "Enhanced Configuration and Control of Robots," which are expressly incorporated herein by reference.

BACKGROUND

The use of Internet-connected devices is becoming commonplace in many aspects of everyday living. Such devices enable users to control and communicate with just about anything from a remote location. For instance, Internet-connected devices can be used to control appliances, lights, thermostats, automobiles, and security systems. Many different industries have demonstrated creative ways in which Internet-connected devices can be utilized.

Although current technologies provide many benefits, product designers of Internet-connected devices continue to face a number of challenges. For instance, because of the need to find energy-efficient, low-cost solutions to further the affordability and the ubiquity of such devices, such devices do not commonly utilize expensive user interface components, such as display screens, touch screens, and the like. In the absence of such interface components, common designs can involve the use of Web server software that enable users to interact with the device from a remote computer operating a Web browser. Such configurations enable users to receive and view status information and send control commands to the device through a Web page.

Although Web-based interface solutions are cheaper than display screens and touch screens, Web-based interface solutions do not always provide a positive user experience when interacting with such devices. For example, management tasks may be particularly difficult when a user is required to interact with a large number of devices. If a user is managing hundreds of Internet-connected devices, he or she is required to maintain Web address records for each device and navigate to each device independently. In addition, given the low-cost nature of common designs, most user interfaces generated by Internet-connected devices do not provide an optimal layout for control buttons and status data.

It is with respect to these and other considerations that the disclosure made herein is presented.

SUMMARY

Technologies described herein provide a mixed environment display of attached control elements. Configurations enable users of a first computing device to interact with a remote computing device configured to control an object, such as a light, appliance, appliance, or any other suitable object. In some configurations, the first computing device causes one or more actions, such as a selection of an object or the display of a user interface, by capturing and analyzing input data defining the performance of one or more gestures, such as a user looking at the object controlled by the second computing device. In some configurations, the displayed user interface includes graphical elements configured to control the object, and the graphical elements can be displayed with a real-world view of the object. The graphical elements can be configured to indicate associations between the real-world view of the object and displayed content, e.g., status data and control buttons. The renderings of graphically attached user interface elements with a view of an object or components of an object enable users to readily identify associations between observed objects and displayed content.

In some configurations, a first computing device, such as a head-mounted display (HMD), can include a hardware display surface configured to create transparent sections enabling a user to view objects through the hardware display surface. In addition, the hardware display surface is configured to display rendered graphical elements over and around the objects viewed through the hardware display surface. The first computing device can obtain control data defining one or more commands for controlling a second computing device. The second computing device can be, for example, configured to control an object, such as an appliance, lamp, garage door opener, or any other item that can be controlled or affected by a device or component.

The first computing device can then display a graphical element comprising the one or more commands on the hardware display surface. The graphical element can be displayed with a real-world view of an object controlled by the second computing device through a transparent section of the hardware display surface. In addition, the graphical element can display status data received from the second computing device. The first computing device can also interpret a gesture or input performed by a user to generate data defining an input command. The first computing device can also communicate the data defining the input command to the second computing device. The second computing device can control the object in response to receiving the input command.

The first computing device can also enable users to select a remote computing device by performing one or more natural gestures or other forms of input. For example, a user can select the second computing device by looking at the second computing device or an object controlled by the second computing device through the hardware display surface of the first computing device. Once the second computing device is selected, the first computing device, among many different actions, can initiate communication with the second computing device and/or control an object by communicating with the second computing device.

It should be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIGS. 3A-3D illustrate views of two objects and renderings of graphical elements having a shape configured to show an association between the contents of the graphical elements and the respective objects;

FIG. 9 is a computer architecture diagram illustrating a computing device architecture for a computing device capable of implementing aspects of the techniques and technologies presented herein.

DETAILED DESCRIPTION

Figure 1:
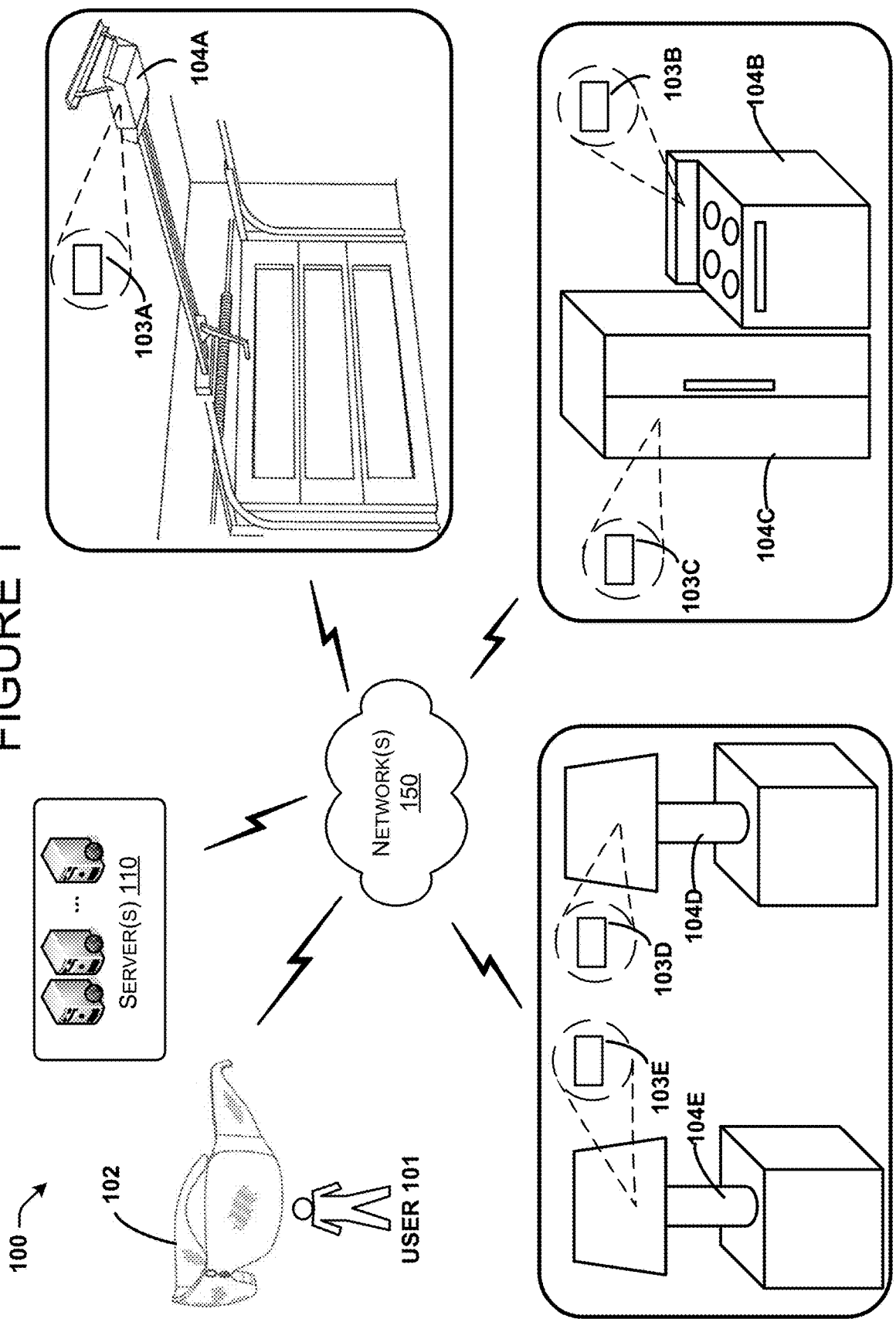
FIG. 1 is a block diagram showing several example devices for enabling a mixed environment display of attached control elements.

Technologies described herein provide a mixed environment display of attached control elements. The techniques disclosed herein enable users to use a first computing device to interact with a second computing device configured to control an object, such as a light, appliance, vehicle, thermostat, or any other suitable object. Configurations disclosed herein enable the first computing device to cause one or more actions, such as a selection of an object or the display of a user interface, by capturing and analyzing input data defining the performance of one or more gestures, such as a user looking at the object controlled by the second computing device. In some configurations, the displayed user interface includes graphical elements configured to control the object, and the graphical elements can be displayed with a real-world view of the object. The graphical elements can be configured to indicate associations between the real-world view of the object and displayed content, e.g., status data and control buttons. The renderings of graphically attached user interface elements with a view of an object or components of an object enable users to readily identify associations between observed objects and displayed content.

In some configurations, a first computing device, such as a head-mounted display (HMD), can include a hardware display surface configured to create transparent sections enabling a user to view objects through the hardware display surface. In addition, the hardware display surface is configured to display rendered graphical elements over and around the objects viewed through the hardware display surface. The first computing device can obtain control data defining one or more commands for controlling a second computing device. The second computing device can be, for example, a controller for an appliance, light, or any other item that can be controlled by a computer.

The first computing device can then display a graphical element comprising the one or more commands on the hardware display surface. The graphical element can be displayed with a real-world view of an object controlled by the second computing device through a transparent section of the hardware display surface. In addition, the graphical element can display status data received from the second computing device. The first computing device can also interpret a gesture or input performed by a user to generate data defining an input command. The first computing device can also communicate the data defining the input command to the second computing device for controlling and/or influencing the object based, at least in part, on the gesture or input performed by the user.

The first computing device can also enable users to select a remote computing device by performing one or more gestures or other forms of input. For example, a user can select a remote computing device by looking at the remote computing device through the hardware display surface of the first computing device. Once a remote computing device is selected, the first computing device can initiate communication with the remote computing device and/or perform a number of interactions, such as those disclosed herein.

By the use of the technologies described herein, a user can interact with a number of remote computing devices without the need to manage and navigate through volumes of machine addresses and credentials. As will be described in more detail below, the disclosed technologies can improve user interaction with a large number of remote devices by allowing a user to selectively interact with a remote device by looking at a device or an object controlled by the device.

An interactive, mixed environment display enables a user to view graphical elements containing status data and contextually relevant controls along with a real-world view of the object or device they are interacting with. Among many benefits provided by the technologies described herein, a user's interaction with one or more devices can be improved, which may reduce the number of inadvertent inputs, reduce the consumption of processing resources, and mitigate the use of network resources. Other technical effects other than those mentioned herein can also be realized from an implementation of the technologies disclosed herein.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings. Furthermore, the claimed subject matter is not limited to implementations that solve any or all disadvantages noted in any part of this disclosure.

While the subject matter described herein is primarily presented in the general context of techniques for providing a mixed environment display of attached control elements, it can be appreciated that the techniques described herein may apply to any type of scenario where two or more people are in communication with one another.

As will be described in more detail herein, it can be appreciated that implementations of the techniques and technologies described herein may include the use of solid state circuits, digital logic circuits, computer component, and/or software executing on one or more devices. Signals described herein may include analog and/or digital signals for communicating a changed state, movement and/or any data associated with motion detection. Gestures captured by users of the computing devices can use any type of sensor or input device.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and in which are shown by way of illustration specific configurations or examples. Referring now to the drawings, in which like numerals represent like elements throughout the several figures, aspects of a computing system, computer-readable storage medium, and computer-implemented methodologies for providing a mixed environment display of attached control elements. As will be described in more detail below with respect to FIGS. 7-9, there are a number of applications and services that can embody the functionality and techniques described herein.

FIG. 1 is a system diagram showing aspects of one example environment 100, also referred to herein as a "system 100," disclosed herein for providing a mixed environment display of attached control elements. In one illustrative example, the example environment 100 can include one or more servers 110, one or more networks 150, a user device 102 associated with a user 101, and one or more controller devices 103A through 103E (collectively "controller devices 103"). For illustrative purposes, the user device 102 and the controller devices 103 are also referred to generically as "computing devices."

FIG. 1 also illustrates aspects of an example scenario involving a number of objects that can be controlled by the controller devices 103. In this example, the first controller device 103A is configured to interact with and control a garage door opener 104A. As also shown in FIG. 1, the second controller device 103B is configured to interact with and control a range 104B, the third controller device 103C is configured to interact with and control a refrigerator 104C, the fourth controller device 103D is configured to interact with and control a first lamp 104D, and the fifth controller device 103E is configured to interact with and control a second lamp 104E. For illustrative purposes, the garage door opener 104A, range 104B, refrigerator 104C, first lamp 104C, and the second lamp 104E are also referred to herein as "objects 104." As will be described in more detail below, the techniques disclosed herein enable users to interact with, e.g., control, communicate with, and otherwise influence, the objects 104 by the use of gestures and other forms of input interpreted by the user device 102.

The example shown in FIG. 1 is provided for illustrative purposes and is not to be construed as limiting. It can be appreciated that the example environment 100 can include any number of controller devices 103, any number of user devices 102, any number of users 101, any number of servers 110, and/or any number of objects 104. It can also be appreciated that the objects may include many other types of items than those shown in FIG. 1.

A controller device 103 can operate as a stand-alone device, or a controller device 103 can operate in conjunction with other computers, such as the one or more servers 110 or other controller devices 103. In some configurations, the controller device 103 can be a portable, single-board computer having one or more components for controlling other devices and/or objects. One example of a commercially available controller device 103 is referred to as the RASPBERRY PI. Other examples include the PHOTON (Wi-Fi) and the ELECTRON (2G/3G cellular) produced by PARTICLE.IO. It can be appreciated that the controller device 103 can also be in the form of a personal computer or any other computing device having components for providing communication to a network and components for interacting with one or more objects.

The user device 102 can operate as a stand-alone device, or a user device 102 can operate in conjunction with other computers, such as the one or more servers 110 or other user devices 102. The user device 102 can be in the form of a personal computer, a wearable computer, such as an HMD, or any other computing device having components for providing communication to a network and components for interacting with the user 101. As will be described in more detail below, the user device 102 can be configured to receive input commands from the user 101, including gestures that are captured by an input device, such as a camera, touchpad or keyboard.

The user device 102, controller devices 103, servers 110 and/or any other computer can be interconnected through one or more local and/or wide area networks, such as the network 150. In addition, the computing devices can communicate using any technology, such as BLUETOOTH, WIFI, WIFI DIRECT, NFC or any other suitable technology, which may include light-based, wired, or wireless technologies. It should be appreciated that many more types of connections may be utilized than described herein.

The servers 110 may be in the form of a personal computer, server farm, large-scale system or any other computing system having components for processing, coordinating, collecting, storing, and/or communicating data between one or more computing devices. In some configurations, the servers 110 can be associated with one or more service providers. A service provider can be a company, person or any type of entity that shares or leases computing resources for facilitating aspects of the techniques disclosed herein. The servers 110 can also include components and services, such as the application services and shown in FIG. 8 for executing one or more aspects of the techniques described herein.

Figure 2:
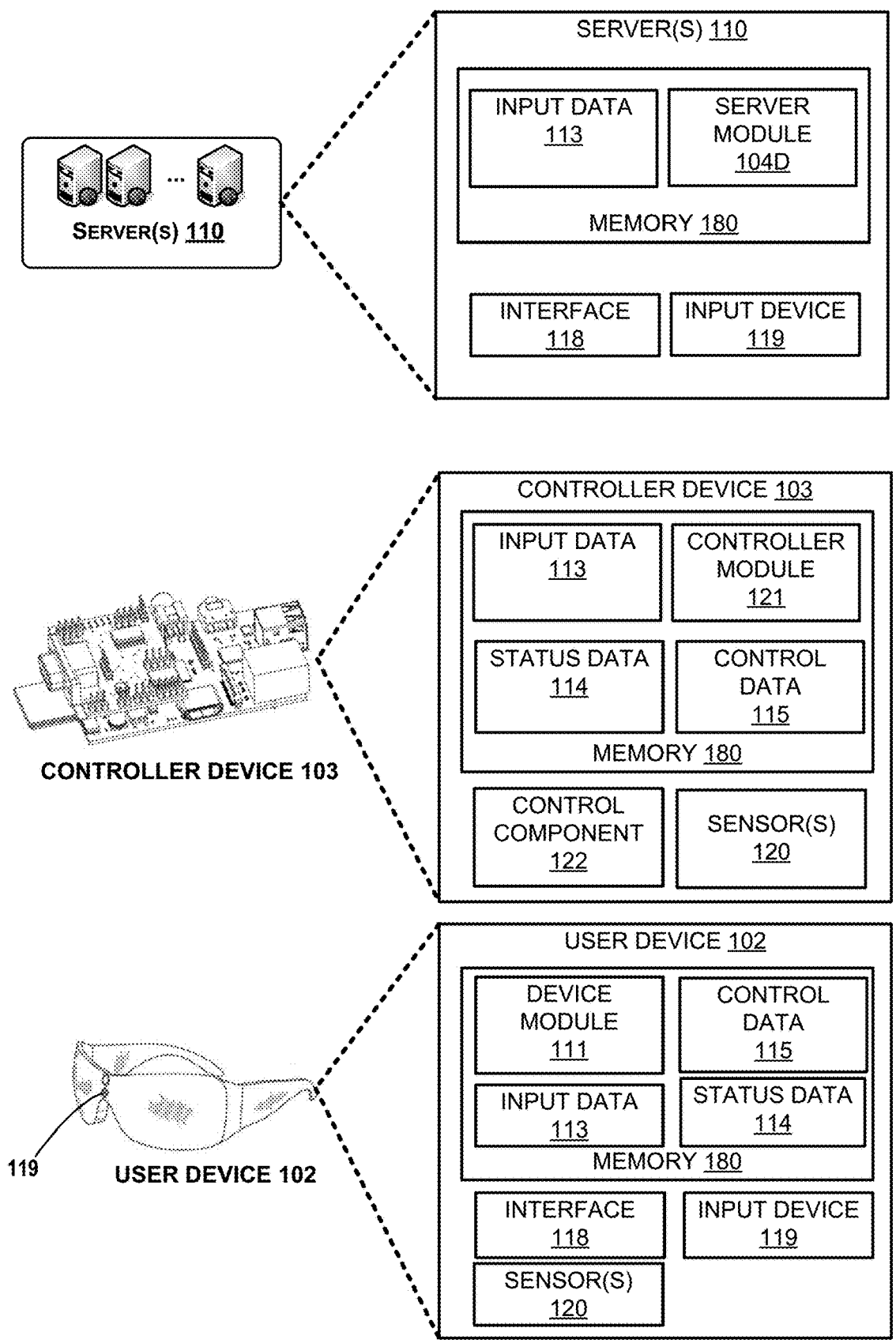
FIG. 2 is a block diagram showing several example components of the devices shown in FIG. 1.

Referring now to FIG. 2, aspects of the user device 102, controller devices 103, and servers 110 are described in more detail. In one illustrative example, a server 110 can include a local memory 180, also referred to herein as a "computer-readable storage medium," configured to store data, such as input data 113, which can be generated by a device and caused by a user. Status data 114 related to one or more computing devices or an object 104 can also be stored in the local memory 180 of the servers 110. The data stored on one or more servers 110 can be a duplicate copy of data stored on the controller devices 103 and/or the user device 102 to allow a centralized service to coordinate aspects of a number of client computers, such as the controller devices 103 and/or the user device 102. It can be appreciated that the servers 110 may store other forms of data other than those shown in FIG. 2.

In some configurations, an individual server 110 can include a server module 107 configured to execute one or more aspects of the techniques described herein. The server 110 can also include an interface 118, such as a screen for displaying data. In addition, server 110 can also include an input device 119, such as a keyboard, mouse, microphone, camera, or any other device suitable to generate a signal and/or data defining any user interaction with the server 110. In some configurations, the servers 110 can be configured to allow a user to interact with the servers 110 from a remote location.

In some configurations, an individual controller device 103 can include a local memory 180, also referred to herein as a "computer-readable storage medium," configured to store data, input data 113, which can be generated by a device and caused by a user. Status data 114 related to one or more devices can also be stored in the local memory 180 of an individual controller device 103. The local memory 180 of an individual controller device 103 can include a controller module 121 configured to execute one or more aspects of the techniques described herein. The controller module 121 can operate as a stand-alone module or the controller module 121 can operate in conjunction with other modules or computers, such as the servers 110 and/or other user devices 102.

The local memory 180 of the controller device 103 can also store control data 115, which can define code, commands, or instructions that can be executed by a controller device 103. In some configurations, the control data 115 may include commands, code, object code, scripts, a compiled program, an interpreted program, or any other executable set of instructions that can be executed and/or interpreted by a computing device, such as one of the controller devices 103, to perform one or more tasks. The control data 115 can also define communication interfaces, such as an Application Programming Interface (API). As can be appreciated, such data can enable a remote computer to send command data (also referred to as "input command" data), to the individual controller device 103 by the use of the API.

The control data 115 can be provided by a controller device 103 or the control data 115 can be provided by another resource, which may involve a service publishing aspects of the control data 115. As will be described in more detail below, when a computing device, such as the user device 102, obtains the control data 115, the computing device can provide commands conformed in accordance with the control data 115 to control aspects of the controller device 103, and thus also influence or control an associated object.

An individual controller device 103 can also include a control component 122 for interacting with one or more objects 104. A control component 122, for example, can include electrical relays for controlling power to one or more objects 104, actuators for controlling the movement of one or more objects 104 or components of an object 104, and/or any type of device enabling the control of, or communication with, an object 104. An individual controller device 103 can also include a sensor 120. A sensor 120, for example, can include a camera, a touch sensor, a proximity sensor, a death field camera, or any other type of input device for generating status data 114 related to an object 104 and/or one or more controller devices 103.

In some configurations, the user device 102 can include a local memory 180 that stores input data 113, which can be generated by a device or a user. As will be described in more detail below, the input data 113 can be received from and/or generated by one or more components of the user device 102, such as a sensor 120 or an input device 119. The input data 113 can also be generated by an internal or external resource, such as a GPS component, compass, or any other suitable component such as those shown in FIG. 9. The sensor 120, which can be a location tracking component, and one or more input devices 119, such as a camera, microphone or keypad, can generate input data 113, which can define any suitable form of user activity, such as a user's gestures, voice commands, gaze direction, etc. In other examples, the input data 113 can be received from one or more systems, such as a social network, email system, search engine, instant message system, or any other suitable application or platform. Examples of such systems can include the services and resources (814-824) shown in FIG. 8. One or more actions, such as the selection of an object or an interaction with an object, can be carried out based on an interpretation of input data 113 from multiple sources.

The memory 180 of the user device 102 can also be used to store status 114 related to one or more devices and/or components. In addition, memory 180 of the user device 102 can also be used to store a device module 111 configured to manage techniques described herein and interactions between a user 101 and the user device 102. For example, as will be described in more detail below, the device module 111 can be configured to process and communicate the control data 115, status data 114, and input data 113, and other data. In addition, the device module 111 can be configured to execute one or more surface reconstruction algorithms and other algorithms for locating objects 104 and capturing images of said objects 104. The device module 111 may be in the form of a productivity application, game application, a virtual reality application, an operating system component or any other application configured to, among other techniques disclosed herein. As will be described herein, the device module 111 is configured to allow a user to interact with a virtual world environment and an augmented reality environment.

In some configurations, a user device 102 can include a hardware display surface 118 (also referred to herein as an "interface 118") configured to display renderings and provide other views described herein. The hardware display surface 118 can include one or more components, such as a projector, a flat or curved screen, or other suitable components for producing a view of an object and/or data to the user 101. In some configurations, the hardware display surface 118 may be configured to cover at least one eye of a user 101. In one illustrative example, the hardware display surface 118 can be configured to cover both eyes of a user 101. The hardware display surface 118 can render one or more images for generating a monocular or binocular view or a stereoscopic display of one or more objects.

The hardware display surface 118 may be configured to allow a user 101 to view objects from different environments. In some configurations, the hardware display surface 118 can display a rendering of an object. In addition, some configurations of the hardware display surface 118 can allow a user 101 to see through selectable sections of the hardware display surface 118 having a controllable level of transparency, enabling the user 101 to view objects in his or her surrounding environment. For illustrative purposes, a user's perspective looking at objects through the hardware display surface 118 is referred to herein as a "real-world view" of an object or a "real-world view of a physical object."

The hardware display surface 118 is described herein as having a "field of view" or a "field of vision," which can be the extent of an observable area that is viewed through the hardware display surface 118 at any given moment. In the examples described herein, when an object is observed through the hardware display surface 118, the direction of the field of view, e.g., a gaze direction, is directed toward the object. For illustrative purposes, gaze direction data defining the direction of the field of view of the hardware display surface 118, and thus the field of view of the user device 102, can be generated by one or more devices, including a compass, a GPS component, a camera and/or a combination of suitable components for generating direction and position data. The analysis of image data of objects having a known position can also be used to generate gaze direction data.

As will be described in more detail below, computer generated renderings of objects and/or data can be displayed in, around, or near the transparent sections of the hardware display surface 118 enabling a user to view the computer generated renderings along with a real-world view of objects observed through the selected portions of the hardware display surface 118.

Some configurations described herein provide both a "see through display" and an "augmented reality display." For illustrative purposes, the "see through display" may include a transparent lens that can have content displayed on it. The "augmented reality display" may include an opaque display that is configured to display content over a rendering of an image, which may be from any source, such as a video feed from a camera used to capture images of an environment around the user device 102. For illustrative purposes, some examples disclosed herein describe a display of rendered content over a display of an image. In addition, some examples disclosed herein describe techniques that display rendered content over a "see through display" enabling a user to see a real-world view of an object with the content. It can be appreciated that the examples of the techniques described herein can apply to a "see through display," an "augmented reality display," or variations and combinations thereof. For illustrative purposes, devices configured to enable a "see through display," "augmented reality display," or combinations thereof are referred to herein as devices that are capable of providing a "mixed environment" display.

A user device 102 can include an input device 119, such as a keyboard, mouse, microphone, camera, depth map camera, touch sensor, or any other device configured to enable the generation of data characterizing interactions with the device 103. As shown in FIG. 2, an input device 119, such as a microphone and/or camera, can be positioned on the front of the user device 102.

The user device 102 can also include one or more sensors 120, such as a gyroscope, sonar sensor, infrared sensor, compass, accelerometer, and/or any other device or component for detecting a position or movement of the device 103 and other objects. The sensors 120 can also enable the generation of data characterizing interactions, such as user gestures, with the device 103. For illustrative purposes, the one or more sensors 120 and/or an input device 119 can enable the generation of input data 113 defining a position and aspects of movement, e.g., speed, direction, acceleration, of one or more objects, which can include devices 103, physical items near a device 103, and/or users 101. In other examples, the sensors 120 and/or input device 119 can enable the generation of input data 113 defining the presence of, and/or characteristics of, an object. For instance, such components can generate data defining a characteristic such as a color, size, shape, or other physical features of an object.

Configurations can enable the user device 102 to capture and interpret hand gestures performed by the user 101 and to generate image data of the field of view described above. Data defining a characteristic can also include the location of an object. A number of components, such as a GPS device, a network device, and/or one or more sensors disclosed herein can be used to generate data defining a location of an object.

In one illustrative example, the sensors 120 and/or input device 119 can enable the generation of input data 113 identifying an object that a user 101 is looking at, which is also referred to herein as a "gaze target." In some configurations, a gaze target can be identified by the use of sensors 120 and/or input devices 119 enabling the generation of data defining a direction in which a user is looking, which is also referred to herein as a "gaze direction." For example, a sensor 120, such as a camera or depth map sensor, mounted to the user device 102 can be directed towards a user's field of view. Image data generated from the input device 119 and/or the sensor 120 can be analyzed to determine if an object in the field of view is in a pre-determined position or area of an image of the image data. If an object is positioned within a pre-determined area of at least one image, such as the center of the image, a device can determine that the object is a gaze target.

Data from many types of input devices 119 and/or sensors 120 can be utilized to identify a gaze target and a gaze direction. For instance, a compass, positioning tracking component (e.g., a GPS component), and/or an accelerometer may be used to generate data indicating a gaze direction and data indicating the location of a particular object. Using such data, the techniques disclosed herein can determine that the particular object is a gaze target. Other data, such as data indicating a speed and direction in which an object is moving can also be used to identify a gaze direction and/or a gaze target. For instance, if a user 101 is observing a vehicle traveling at a particular velocity and direction, such data can be communicated to the user device 102 from the vehicle, and such data can be combined with other data using know techniques to determine that the vehicle is a gaze target.

In some configurations, one or more sensors 120 can be directed toward at least one eye of a user. Data indicating the direction and/or position of at least one eye can be used to identify a gaze direction and a gaze target. Such configurations can be used when a user is looking at a rendering of an object displayed on a hardware display surface 118. In one illustrative example, if an HMD worn by a user has two distinct objects rendered on the hardware display surface 118, the one or more sensors 120 directed toward at least one eye of a user can enable the generation of eye position data indicating if the user is looking at the first rendered object or the second rendered object. Eye position data can be combined with other data, such as gaze direction data to identify a gaze target, which can be based on a rendered object displayed on the hardware display surface 118 or a real-world object observed through the hardware display surface 118.

As summarized above, a user device 102, such as an HMD, can enable the selection of an object 104 controlled by a controller device 103 by capturing and analyzing input data 113 defining a performance of one or more gestures or other forms of input. For illustrative purposes, the selection of an object can also mean the selection of a controller device 103 associated with the object 104, and the selection of a controller device 103 can also mean the selection of the object associated with the object. As will be described in more detail below, the selection of an object 104 causes the user device 102 to obtain address information to communicate with one or more associated controller devices 103.

Once an object 104 is selected, the user device 102 can take one or more actions. For example, the user device 102 can initiate communication with the remote computing device and/or cause the display of one or more graphical elements displaying content, such as commands configured to control the controller device 103. In addition, the user device 102 can generate data defining an input command in response to a selection of the graphical elements. The data defining the input commands can be communicated to the controller device 103 for execution. The execution of the commands can cause the controller device 103 to control the object 104, obtain a status from the object 104, or cause other interactions with the object 104. Status data associated with the controller device 103 can be communicated to the user device 102 for display to a user 101. FIG. 3A through FIG. 3D provide an illustrative example showing such techniques, where a user device 102, such as an HMD, is used to select and interact with two controller devices 103 respectively associated with two different lamps.

Figure 3A:
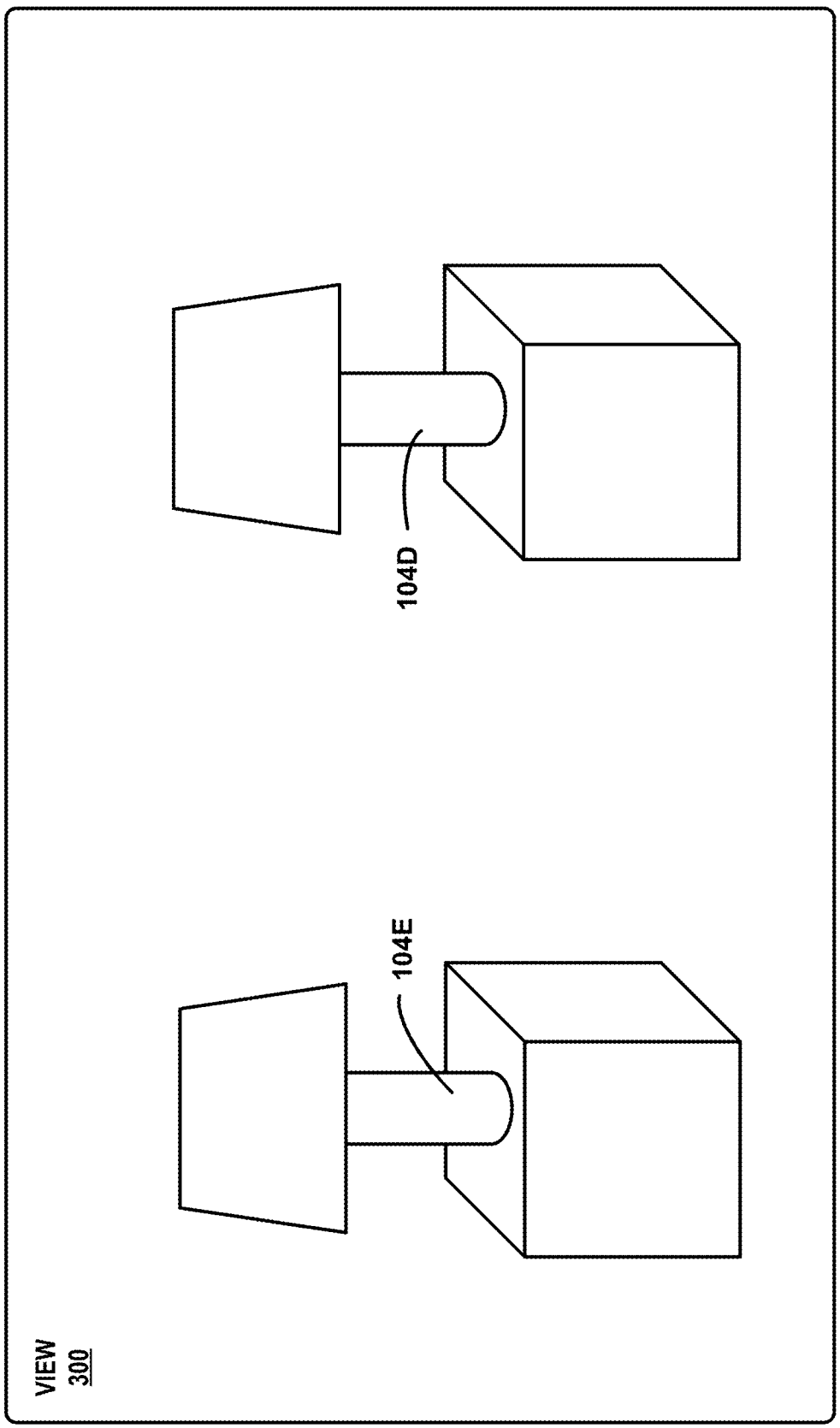

FIG. 3A illustrates one example view 300 that is from the perspective of the user device 102, e.g., an HMD, having the field of view directed toward the first lamp 104C and the second lamp 104E, which are collectively and generically referred to as "objects 104." In this example, the view 300 includes a real-world view of the objects 104 through the hardware display surface 118 of the user device 102. Although this example view 300 illustrates a configuration involving a real-world view of the objects 104, by the use of image data generated by a camera directed toward the field of view, it can be appreciated that a rendering of the objects 104 can be displayed on the hardware display surface 118.

In the present example, the user 101 can utilize the user device 102 to select one of the two objects 104 by directing the field of view of the user device 102 toward the desired object 104. Such an action can be performed, for example, when the user 101 turns to look at an object of interest. In this example, the user 101 first turns the field of view toward the first lamp 104D. By the use of the techniques disclosed herein, the first lamp 104D and/or an associated controller device, e.g., the fourth controller device 103D, can be selected. Once an object, such as the first lamp 104D, is selected, the user device 102 can take one or more actions. For example, the user device 102 can display a graphical element, generate an audio signal, and/or provide any other form of notification to confirm the selection of the object. In another example, in response to a selection of the object, the fourth controller device 103D can cause the communication of control data defining one or more commands for controlling the fourth controller device 103D and/or the first lamp 104D to the user device 102. In such an example, the control data communicated from the fourth controller device 103D can define instructions for controlling a component, e.g., diming the lamp, turning the lamp on or off, etc. In another example, in response to a selection of an object, the user device 102 can receive status data defining a status of one or more devices and/or components.

Figure 3B:
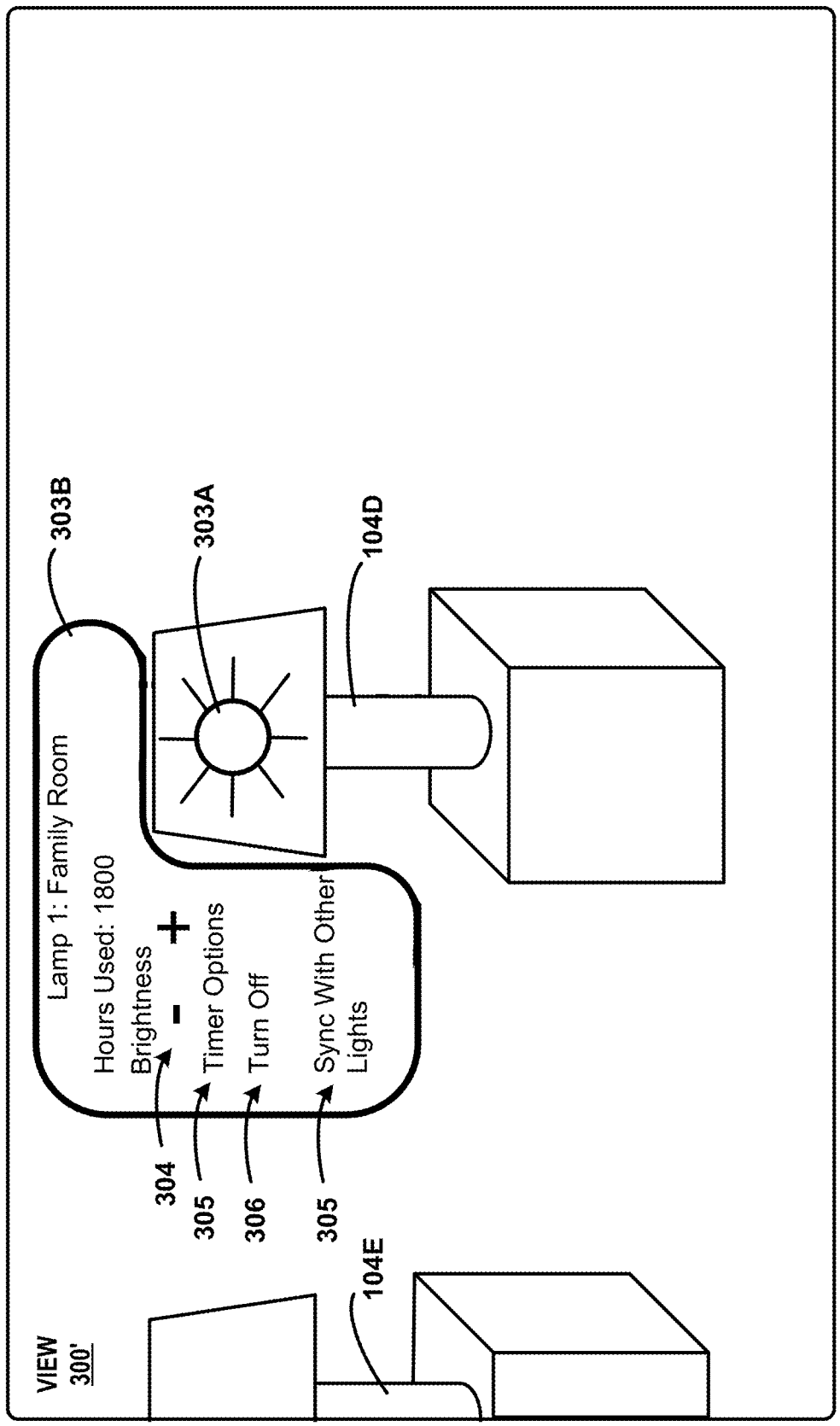

FIG. 3B shows one example view 300' that can be displayed to the user 101 when the first lamp 104D is selected. As shown, in response to the selection, the user device 102 can cause the display of one or more graphical elements along with the real-world view of the first lamp 104D. In this example, a first graphical element 303A indicates a status of the first lamp 104D. Specifically, the first graphical element 303A, by the use of rendered lines and a circle, indicates that the first lamp 104D is turned on.

Also shown in FIG. 3B, a second graphical element 303B comprises status data and selectable control elements for controlling the fourth controller device 103D and the first lamp 104D. In this example, the status data includes an identifier for the first lamp 104D, e.g., "Lamp 1: family room." The status data also indicates a number of hours the lamp has been used. The second graphical element 303B also includes a set of selectable control elements 305 for causing a display of other graphical elements, e.g., sub-menus (not shown), for displaying additional commands and/or other status data. In addition, based on the control data, the second graphical element 303B can include one or more selectable control elements 306 for controlling the first lamp 104D and/or the fourth controller device 103D. The user device 102 is configured to process a command upon the selection of one or more selectable control elements 306. In this example, the selectable control elements can be used to turn the lamp on or off and change the brightness of the lamp.

As shown in FIG. 3B, the second graphical element 303B is configured to show an association between the contents of the second graphical element 303B and the real-world view of the first lamp 104D. In this example, the shape of the second graphical element 303B is use to show one or more associations. Specifically, the shape of the second graphical element 303B is shaped and positioned around the first lamp 104D to show the various associations, e.g., between the contents of the graphical element and the object, between the graphical element 303B and the object. The graphical element 303B can also show an association between the displayed content and the fourth controller device 103, which may include a rendering of the fourth controller device 103D or a real-world view of the fourth controller device 103D. Although the shape of the graphical element is used to show an association between the contents of the graphical element and the object, it can be appreciated that any shape, color, line, or any other indicator, such as an audio signal, can be used to indicate an association between an object and displayed content.

As summarized above, during the display of one or more graphical elements, a sensor 120 or input device 119 of the user device 102 can be used to capture a gesture or another form of input to generate input data 113. The user device 102 can process the input data 113, the control data 115, and/or other data to generate a command configured to execute computer-executable instructions at the controller device 103. FIG. 3C shows one example where the user device 102 is used to capture a gesture performed by the user 101 to enable the generation and communication of a command for controlling the fourth controller device 103D and the first lamp 104D.

FIG. 3C shows the example view 300' of the real-world view of the first lamp 104D with a user gesture interacting with the second graphical element 303B. In the present example, the sensor 120, e.g., a camera directed toward the field of view, of the user device 102 captures a gesture performed by the user 101. As shown in FIG. 3C, the user 101 is performing a gesture indicating a selection of a selectable control element configured to change the brightness of the first lamp 104D. When such an input is detected, data defining a command can be communicated from the user device 102 to the fourth controller device 103D and the first lamp 104D.

In some configurations, the user device 102 can modify the display of the graphical elements related to the first lamp 104D based on one or more actions. In one example, the graphical elements can be removed from the view 300' when the user 101 looks away from the first lamp 104D. Other user actions, such as a voice input, a gesture, or other type of input, can also cause the removal of the graphical elements. As will be describe in more detail below, other user actions cause the user device 102 to take other actions.

In the present example, the user 101 interacts with the second lamp 104E by looking at, e.g., directing the field of view of the user device 102 away from the first lamp 104D and toward the second lamp 104E. In response to the detection of such activity, the techniques disclosed herein can remove the display of the first and second first graphical elements (303A and 303B), select the second lamp 104E, and display other graphical elements related to the second lamp 104E and the fifth controller device 103E.

Figure 3D:
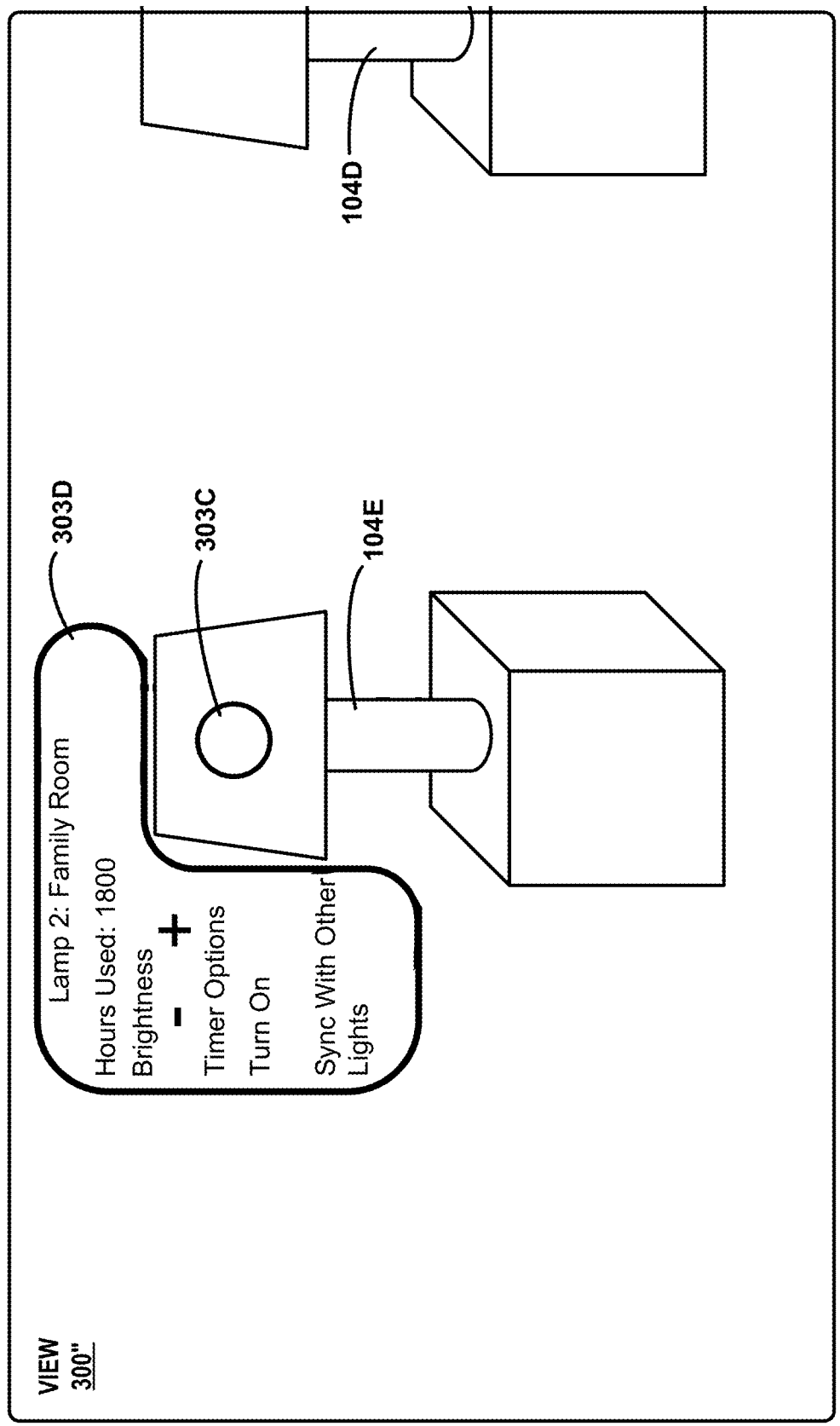

FIG. 3D shows another example view 300" that can be displayed to the user 101 when the second lamp 104E is selected. In this illustrative example, a third graphical element 303C indicates a status of the second lamp 104E. In this illustrative example, the third graphical element 303C indicates that the second lamp 104E is turned off. Also shown, a fourth graphical element 303D comprises status data and commands for controlling the fifth controller device 103E and the second lamp 104E. The fourth graphical element 303D comprises the identifier, status data, and selectable control elements as described with respect to FIG. 3B.

The techniques disclosed herein also enable users to interact with multiple objects and/or devices at one time. For instance, in the above example involving the lamps, the user can control both lamps by the view shown in FIG. 3A. When Both lamps are within the viewing area, the user device 102 can select both lamps. In such configurations, one or more graphical elements can be displayed to control both lamps. Alternatively, or in addition to the display of the graphical elements, the user device 102 can generate a notification indicating a selection of both lamps. The notification can involve a generation of an audio signal, e.g., a generated voice indicating "both lamps are selected," or another signal suitable for providing such a notification. Once the lamps are selected, the user device 102 can control both objects. For example, the user can provide a gesture or an input command, which may include a voice command, to control the lamps. For instance, the user may state, "turn all lights off" or "turn all lights on." This example is provided for illustrative purposes and is not to be construed as limiting. Can be appreciated that configurations disclosed herein can be used to control any number of objects and/or remote controller devices 103.

To further the above example, consider a scenario where a user is standing outside of a house. By looking in the direction of the house, a number of different type of objects are selected, e.g., a number of the lights, a number of appliances, one or more thermostats, etc. The user can then provide a gesture or other form of input to control select objects or categories of objects. For instance, the user can provide a voice command indicating they wish to "turn all lights off" or "turn all lights on." In addition, the user can point in the direction of the thermostat while looking at the house and state "turn the heat up to 71 degrees." One or more technologies for interpreting such inputs can be used to select and control different objects and different categories of objects by directing appropriate commands to the appropriate controller devices 103.

Figure 4A:
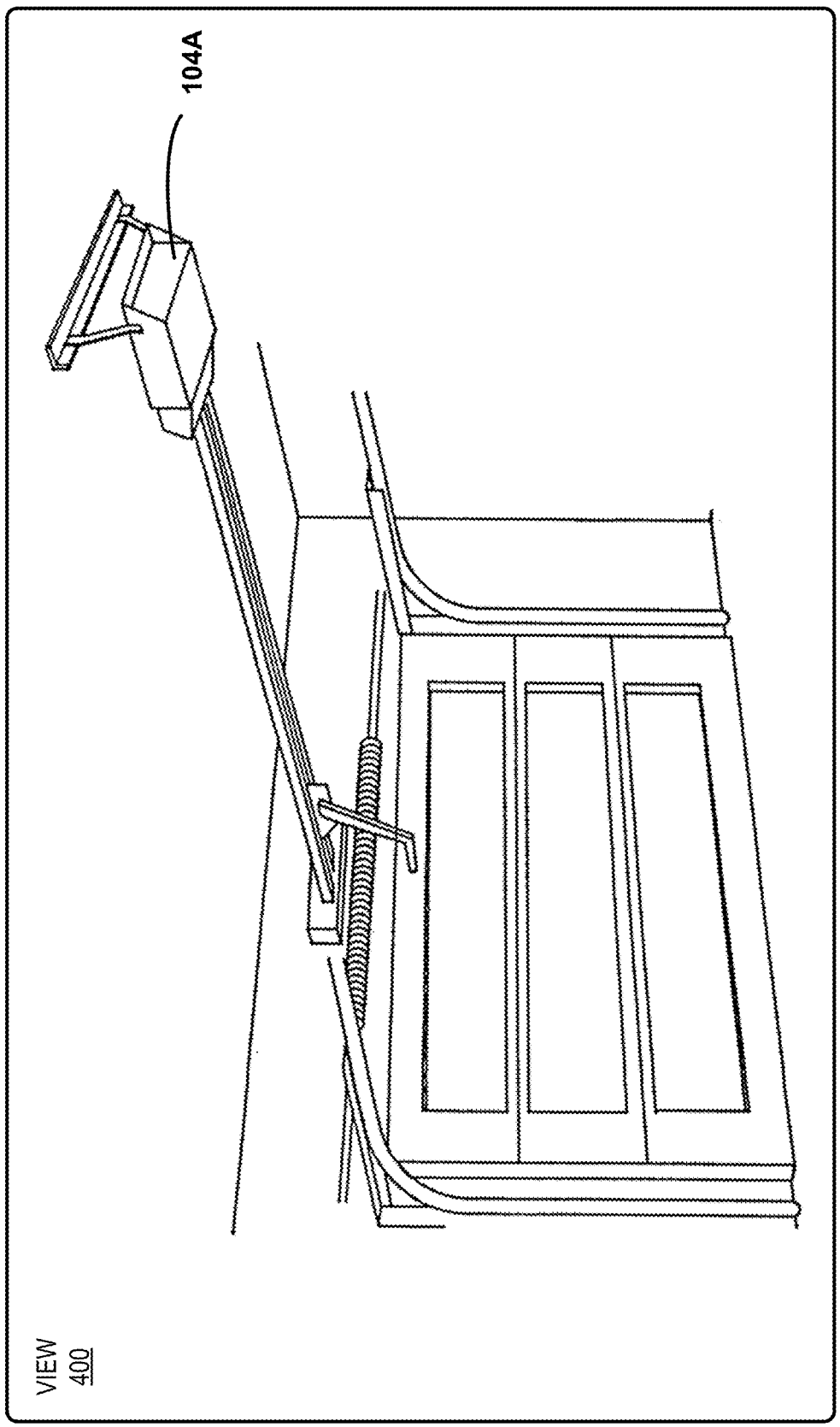
FIGS. 4A-4C illustrate a view of an object and a rendering of a graphical element having a component configured to show an association between the contents of the graphical element and the object.
Figure 4B:
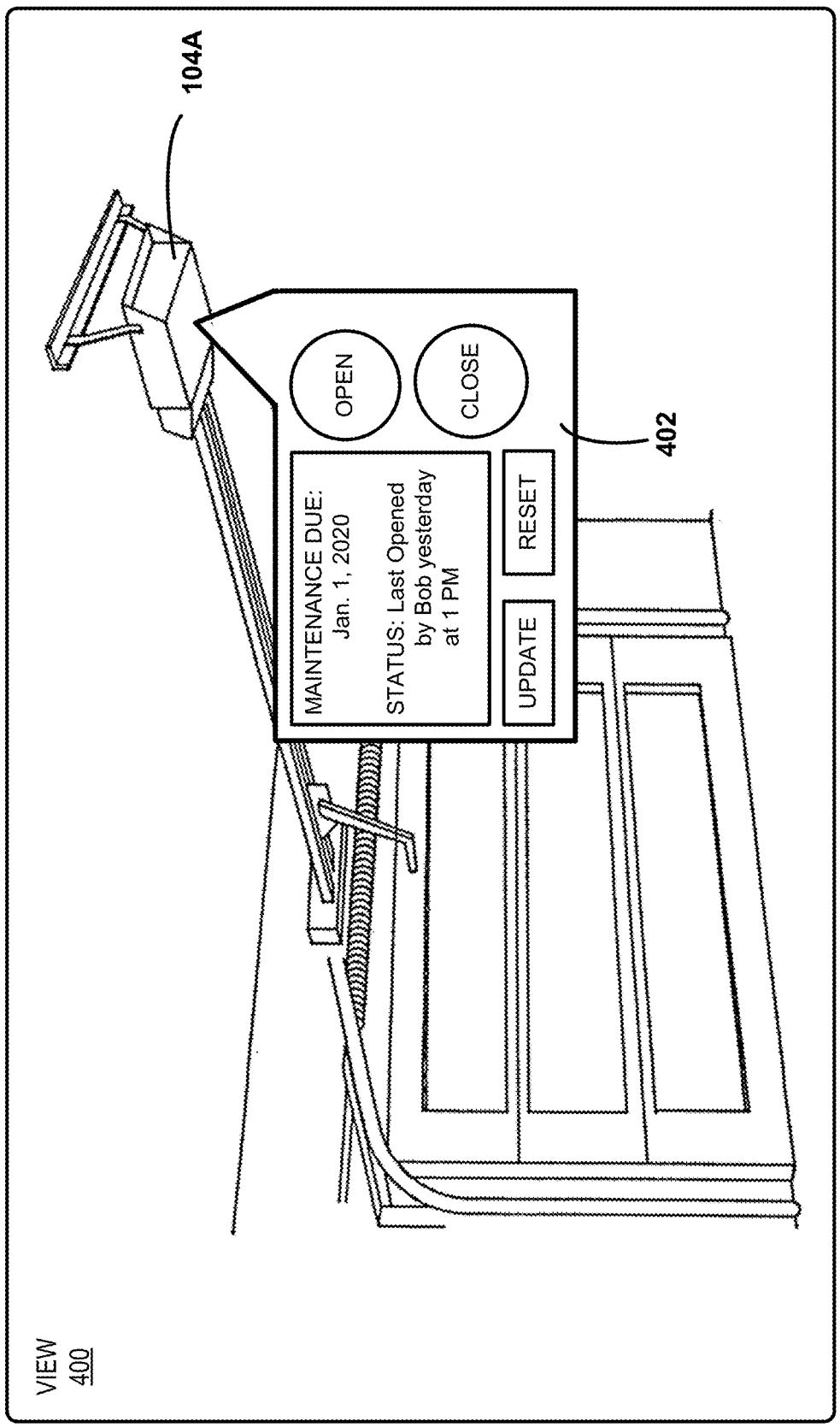
Figure 4C:
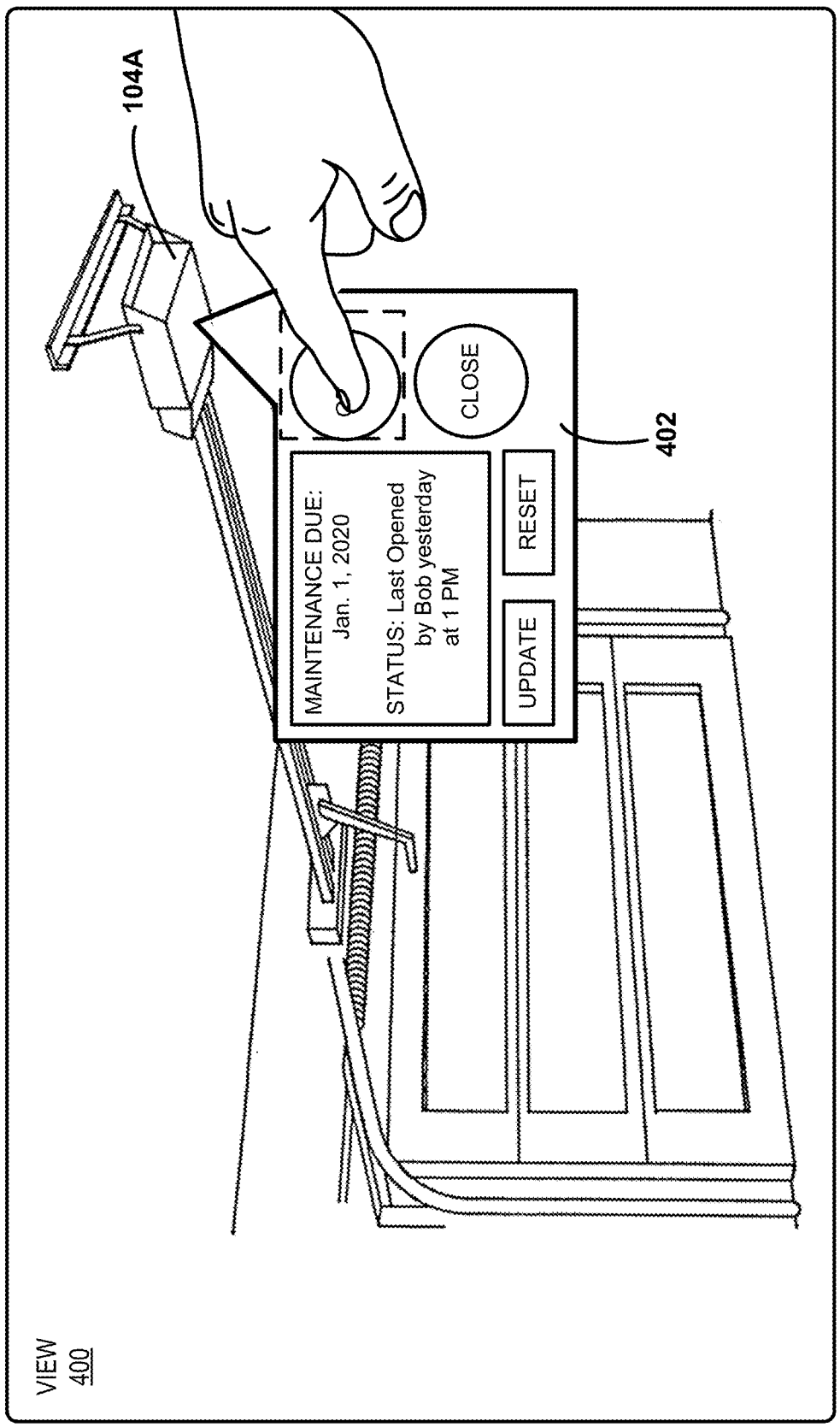

FIG. 4A through FIG. 4C illustrate another example where a user device 102, in the form of an HMD, is used to interact with the garage door opener 104A. In this illustrative example, the field of view of the user device 102 is directed towards the garage opener 104A thereby creating a real-world view of the garage opener 104A through the interface 118 of the user device 102. FIG. 4A shows an example view 400 that can be displayed to the user 101 in this scenario. As summarized above, the user device 102 can select the garage door opener 104A and/or an associated computing device, e.g., the first controller device 103A, when such a scenario is detected by one or more techniques disclosed herein. Upon the selection of the garage door opener 104A, the user device 102 can take one or more actions, which can include the display of a graphical element comprising a selectable element configured to control the garage door opener 104A.

FIG. 4B shows one example view 400 that can be displayed to the user 101 when the garage door opener 104A and/or an associated device are selected. As shown, the user device 102 can cause the display of a graphical element 402 along with the real-world view of the garage opener 104A. In this example, the graphical element 402 includes selectable control elements that enable the user device 102 to control the garage door opener 104A. As shown, one or more selectable control elements can be selected to initiate one or more actions that cause the garage door to open or close. In addition, the selection of a selectable control element can cause a software update for the garage opener 104A and/or the first controller device 103A. Content, such as status data, can be included in the graphical element 402. The example status data shown in FIG. 4B indicates a maintenance due date as well as data defining recent user activity. In this example, the user activity identifies a user of the garage door opener 104A as well as a timestamp of when the garage door opener 104A was last operated.

As shown in FIG. 4B, the graphical element 402 is configured to show an association between the graphical element 402 and the garage door opener 104A. In this example, the outline of the graphical element 402 comprises lines that are directed toward the garage opener 104A. Although lines are used to show an association between the contents of the graphical element 402 and the garage door opener 104A, it can be appreciated that any shape, color, or any other indicator can be used to show the association between an object, such as the garage door opener 104A and other displayed content.

FIG. 3C shows the example view 400 of the real-world view of the garage door opener 104A with a user gesture interacting with the graphical element 402. In the present example, the sensor 120 of the user device 102 captures a gesture performed by the user 101. As shown in FIG. 3C, the user 101 is performing a gesture indicating a selection of a selectable control element configured to open the garage door. When such an input is detected, data defining a command can be communicated from the user device 102 to a controller device 103 associated with the garage door opener 104A. The controller device 103 can then cause the garage door opener 104A to operate.

As summarized above, the user device 102 can interact with any computing device configured to interact with an object. User interface graphical elements can be displayed in proximity to a real-world view of any object that can be controlled by a network-connected computer. Graphical elements similar to those described above can be utilized to control, and interact with, various objects including the appliances shown in FIG. 1. For example, graphical elements can be rendered in association to the range 104B and the refrigerator 104C in a manner as described herein.

In yet other examples, the techniques disclosed herein can be used to control and communicate with controller devices that may be embedded in other objects, such as a vehicle. An example of such an application is shown in FIG. 5A through FIG. 5C.

Figure 5A:
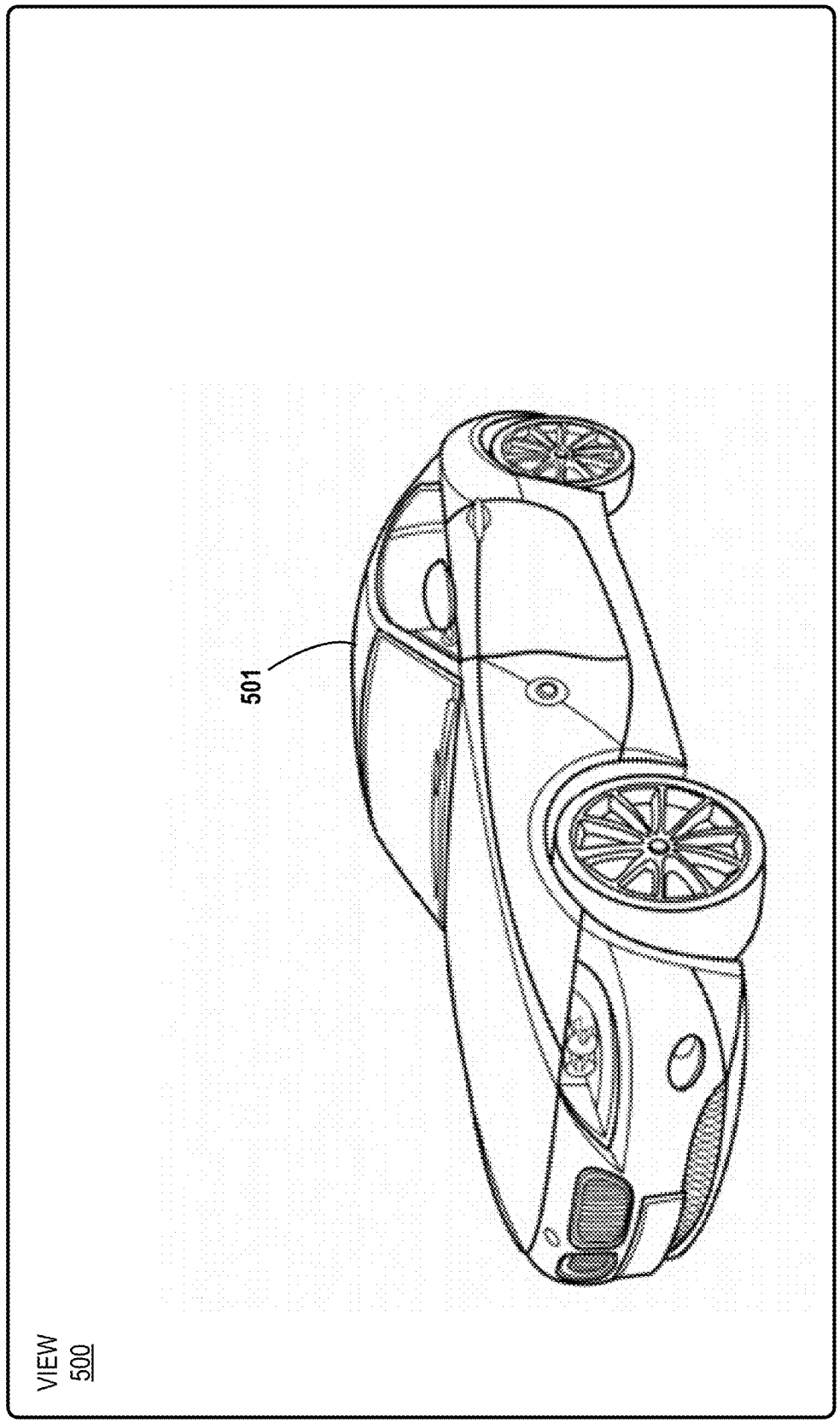
FIGS. 5A-5C illustrate a view of an object and a rendering of a graphical element comprising selectable control elements and status data, the graphical element having a component configured to show an association between the contents of the graphical elements and the object.

FIG. 5A shows an example view 500 that can be displayed to the user 101 when he or she approaches a vehicle 501. FIG. 5B shows the example view 500 of two graphical elements that can be displayed to the user 101 when the vehicle 501 and/or an associated computing device is selected by using the techniques described herein. FIG. 5C shows the example view 500 that can be provided to the user 101 when the user 101 performs a gesture causing the user device 102 to communicate commands to the computing device associated with the vehicle 501.

Figure 5B:
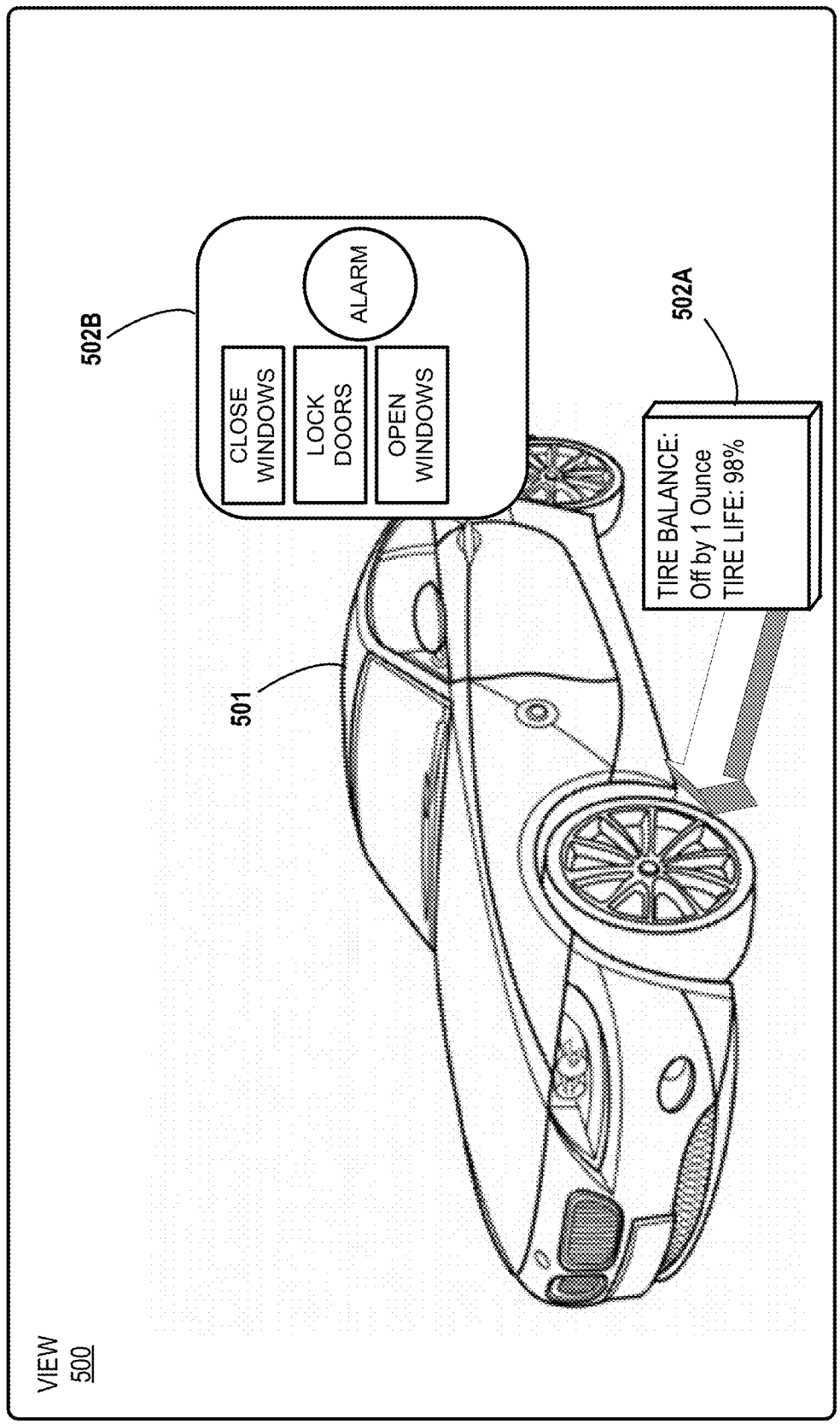
Figure 5C:
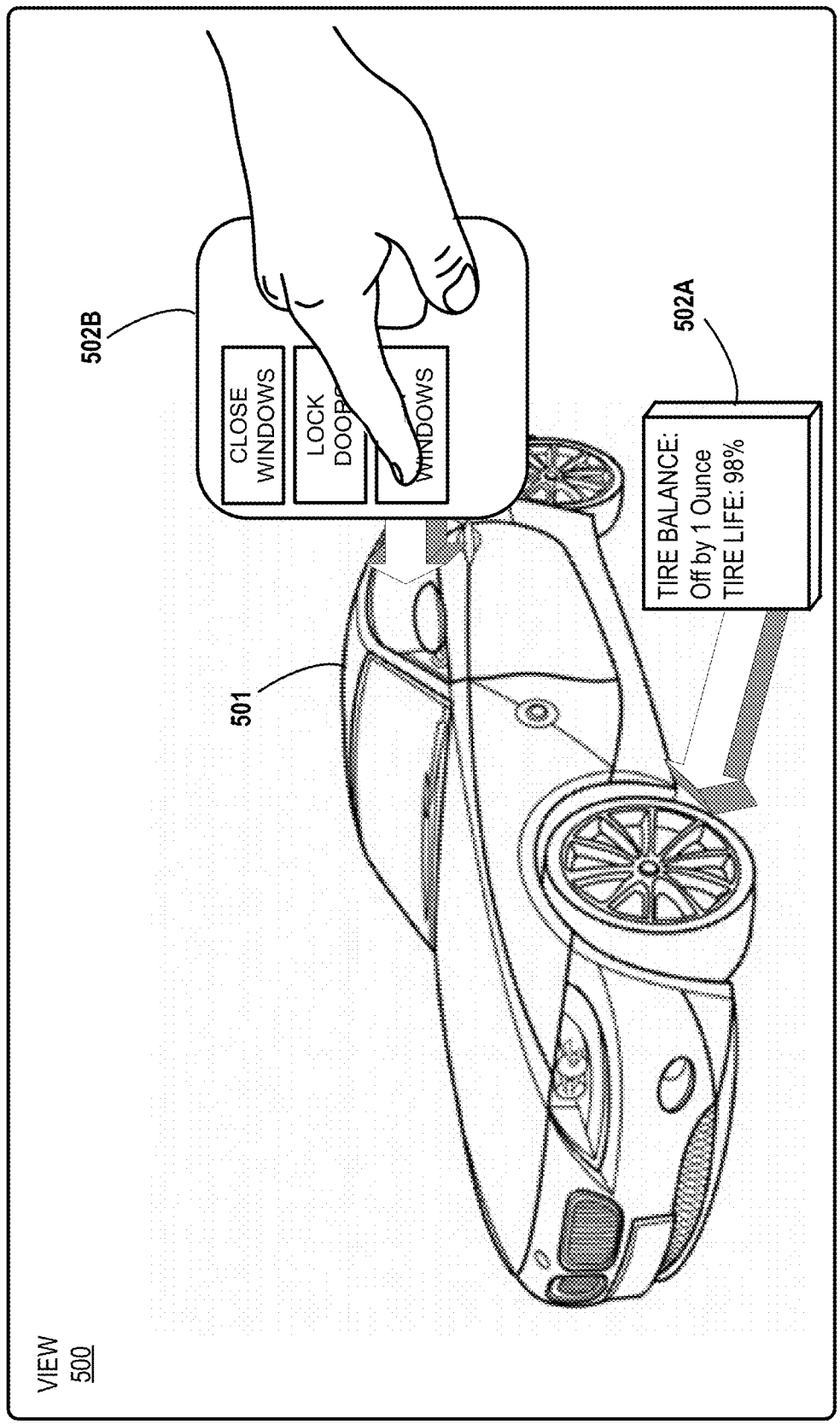

As shown in FIG. 5B, a first graphical element 502A can be displayed on the interface 118 with a real-world view of the vehicle 501. Also shown, the first graphical element 502A is configured to illustrate an association, e.g., an attachment, between the displayed status data and a component of the vehicle 501. In this particular example, the displayed status data describes aspects of one of the tires, and the graphical element 502A is configured to indicate the attachment between the displayed status data and one of the tires.

Also shown in FIG. 5B, a second graphical element 502B having selectable control elements, e.g., buttons for opening and closing the windows, and a button for locking the doors, can be displayed along with a real-world view of the vehicle 501. In this example, the selectable control elements of the second graphical element 502B relate to various components of the vehicle 501, e.g., the windows and doors.

FIG. 5C illustrates one example where the second graphical element 502B is configured, e.g., by the use of an arrow, to indicate an association between a component, e.g., a window, of the vehicle 501 and one or more selectable control elements. The graphical element can be static or dynamic in indicating one or more associations. For example, the arrow can be displayed continuously, or the arrow can be displayed in response to one or more actions. The example shown in FIG. 5B and FIG. 5C show how an association between an object (or a component of an object) and content can be displayed in response to a selection, e.g., a user selection, of the one or more selectable control elements. In such an example, the second graphical element 502B can be configured as shown in FIG. 5B, then transition to the configuration as shown in FIG. 5C in response to one or more actions, such as a user action.

As shown in FIG. 5B and FIG. 5C, the second graphical element 502B can have one state where the second graphical element 502B does not indicate an attachment, and then upon the selection of one or more selectable control elements, the second graphical element 502B can have a second state where the second graphical element 502B indicates the attachment between the control element and a component of an object. In the present example, the second graphical element 502B indicates an association with the window by the use of an arrow. This example is provided for illustrative purposes and is not to be construed as limiting. It can be appreciated that any shape, color, or any other indicator a be used to show an attachment between a selectable control element and an object or a component of the object.

In some configurations, the techniques disclosed herein may also generate a graphical element to show an association between an object and a controller device 103 associated with the object. In some scenarios, a controller device 103 associated with an object may not be visible upon a visual inspection of the object. In such circumstances, the techniques disclosed herein can generate one or more graphical elements representing a controller device 103. Examples of such renderings are shown in FIG. 1. For example, if the fourth controller device 103D is embedded inside the first lamp 104D, a graphical element representing the fourth controller device 103D can be generated in proximity to a real-world view of the first lamp 104D. In addition, the graphical representation may have one or more lines or shapes to show an association between an object and a controller device 103 associated with the object. In the example shown in FIG. 1, a circle in several lines may be used to show an association between a rendering of a controller device 103 and the object.

By the use of the graphical renderings described above, techniques disclosed herein enable a user of a device to control multiple objects that may not be in a direct view with respect to the user device 102. For instance, with respect to the garage door scenario, if a user is looking towards the garage door from the outside and the garage door is closed, techniques disclosed herein may render an image representing the garage door opener. In another example, if a user is looking towards a room with multiple light switches, the user device 102 can display renderings of each switch or enable a real-world view of each switch. The user device 102 can then control each switch by an input caused by the user. In one illustrative example, the user may provide universal input command, such as a gesture or a voice command "turn all the lights on" or "turn all the lights off" to control multiple controller devices 103.

In some configurations, the techniques disclosed herein enable a device to provide multiple interfaces, e.g., graphical elements, holograms, etc., in different locations that are attached to one or more objects. For example, in a scenario where a user is looking towards a room with a three-way light switch, a device can render a graphical element for each switch or one graphical element for both switches. Such configurations can enable a user to control one object, e.g., one light, from two switches. In yet another example scenario, when a user is looking at a house through an interface of a user device 102, the user device 102 can display a virtual thermostat in every room. Each virtual thermostat can be configured to display status data and/or one or more selectable graphical elements for controlling each thermostat. The user device 102 can be configured to interpret various forms of input, including a voice input, to direct commands to an individual thermostat, groups of thermostats, and/or all of the thermostats. Thus, in such an example scenario, when a user is viewing multiple virtual thermostats individually attached to rooms of a house, the user can initiate an input command directed to one thermostat, e.g., the user could state "turn down the temperature in the attic by 5 degrees."

Figure 6:
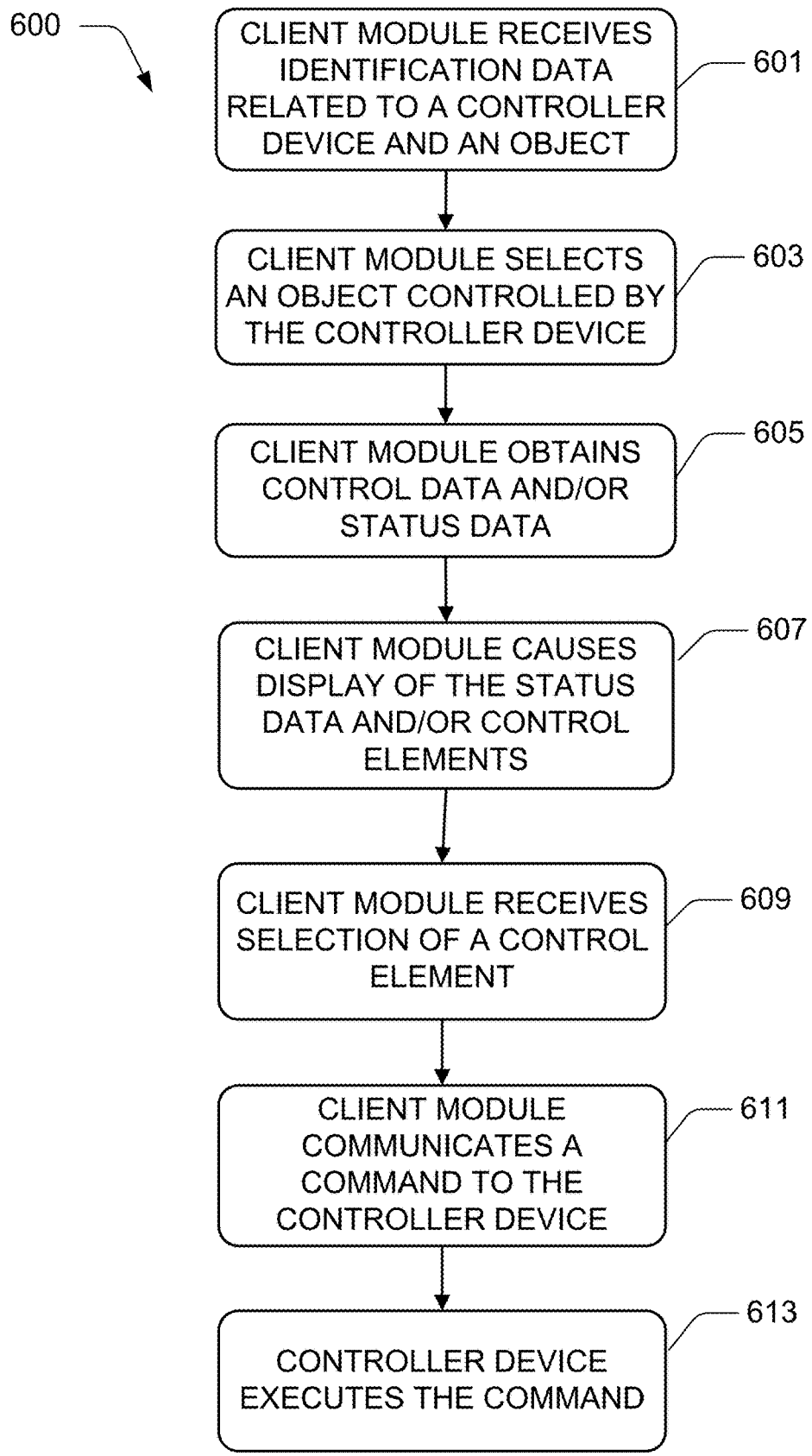
FIG. 6 is flow a diagram illustrating a routine that may be used for providing a mixed environment display of attached control elements.

Turning now to FIG. 6, aspects of a routine 600 for providing a mixed environment display of attached control elements are shown and described below. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods can end at any time and need not be performed in its entirety. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For example, the operations of the routine 600 are described herein as being implemented, at least in part, by an application, component and/or circuit, such as the device module 111 and/or the server module 107. In some configurations, the device module 111 and/or the server module 107 can be a dynamically linked library (DLL), a statically linked library, functionality enabled by an application programing interface (API), a compiled program, an interpreted program, a script or any other executable set of instructions. Data, such as the input data 113, received by the device module 111 and/or the server module 107 can be stored in a data structure in one or more memory components. The data can be retrieved from the data structure by addressing links or references to the data structure.

Although the following illustration refers to the components of FIG. 1 and FIG. 2, it can be appreciated that the operations of the routine 600 may be also implemented in many other ways. For example, the routine 600 may be implemented, at least in part, by a processor of another remote computer or a local circuit. In addition, one or more of the operations of the routine 600 may alternatively or additionally be implemented, at least in part, by a chipset working alone or in conjunction with other software modules. Any service, circuit or application suitable for providing input data indicating the position or state of any device may be used in operations described herein.

With reference to FIG. 6, the routine 600 begins at operation 601, where the device module 111 receives identification data of one or more remote devices. Generally described, the identification data can include data that relates aspects of an object with aspects of a controller device 103. For example, the identification data can include an address for a controller device 103, such as an IP address, MAC address, or any other network-based identifier. The address for the controller device 103 can be associated with one or more characteristics of the controller device 103 and/or an object controlled by the controller device 103. For instance, identification data can define characteristics of an object, such as the first lamp 104D. The identification data can define characteristics colors, shapes, anomalies, imperfections, or any other identifier for a physical object. The characteristics can then be associated with an address of an associated device, such as the fourth controller device 104D.

In some configurations, the identification data can associate an address for a particular controller device 103 with location data. The location data may define a location for the particular controller device 103 and/or an object controlled by the particular controller device 103. As will be described below, the techniques disclosed herein may utilize such information to find an address for a particular controller device if the user device 102 detects that the particular controller device is within a predetermined distance.

The identification data may be configured manually, or provided by a service or a remote resource. In some configurations, the identification data may be generated by a device, such as the user device 102. To generate such data, the user device 102 may enter an initialization mode. While in the initialization mode, a user may approach a particular object and/or look at a particular object, and provide an input to instructing the device to record data defining one or more characteristics related to the object in a data structure for future access. For example, with reference to FIG. 5A, a user 101 may be looking at a vehicle 501 through an interface 118 of the user device 102. While the user 101 is looking at the vehicle 501, the user may provide a voice command, a hand gesture, or other form of input to instruct the storage of the identification data, which can include location data, image data, and/or metadata defining one or more characteristics related to an object. In addition, the user 101 or a device can provide and store an address for the computing device associated with the object, e.g., the vehicle 501.

While in the initialization mode, in some configurations, a sensor 120 of the user device 102 can obtain an image of the object, such as the vehicle 501. The image data may be processed to obtain one or more characteristics of the object. The image data, location data of the object, data describing one or more characteristics of the object, and/or other identifying information can be associated with the address of associated controller device 103 and stored in a data structure in memory for future access. These examples are provided for illustrative purposes and are not to be construed as limiting. It can be appreciated that the identification data can be generated by other computers, and may include other types of data indicating an address and data identifying an object or an associated controller device.

Once the identification data is received or generated, the user device 102 can enter a regular operation mode where the user device 102 is utilized to select one or more objects and interact with the object using an associated computing device 103. The following process blocks illustrate aspects where a user device 102 selects an object, initiates the communication of status data, control data, and/or command data to control one or more aspects of a selected object and an associated controller device 103.

Returning to FIG. 6, at operation 603, the device module 111 can select an object controlled by a controller device 103. As summarized above, an object can be selected by the use of any number of techniques. For example, an object can be selected by an analysis of input data 113 defining any suitable user activity, such as a user's gestures, voice commands, gaze direction, or any other type of input. In other examples, an object can be selected by an analysis of input data 113 received from one or more systems, such as a social network, email system, phone system, instant message system, or any other suitable application or platform.

In one illustrative example, input data 113 identifying a gaze target and/or a gaze direction can be analyzed to identify and select an object and/or a controller device 103 associated with the selected object. For example, input data 113 received from one or more devices, such as a user device 102, can indicate that a user 101 is looking at a particular object. Such activity can be determined by the use of image data that is captured by a sensor 120 directed toward the field of view of the device. By the use of one or more image processing technologies, one or more characteristics, e.g., the size, shape, location, or any aspect of the object can be identified and stored in a data structure. Data defining the identified characteristics can be analyzed and compared to the identification data described above to determine select an object and obtain an address of an associated controller device 103.

With reference to the example shown in FIG. 3B, during operation of the user device 102, input data 113 generated by an input device 119 and/or a sensor 120 can indicate that a user is looking at the first lamp 104D having a set of characteristics. In this example, it is a given that the user device 102 stores identification data defining a set of characteristics of the first lamp 104D. If the set of characteristics of the identification data has a threshold amount of similarities to the set of characteristics of the input data 113, the user device 102 can select the first lamp 104D. By the use of the identification data, an address for a controller device 103 associated with the selected object may be obtained.

Location data can also be utilized to select an object. For instance, the techniques disclosed herein may select a particular object if the user device 102 is within a predetermined distance of that particular object. Such techniques may be combined with data defining the gaze direction. Thus, the techniques disclosed herein may select a particular object if the user device 102 is within a predetermined distance of that particular object, and if the field of view of the user device 102 is directed towards the object.

In the process of selecting a particular object, the input data 113 can include contextual data from one or more remote resources. For example, if a user performs a number of searches on a search engine, provides comments on a social network, and/or causes communication about a particular object, such as a vehicle or appliance, such data can be used to identify and select a particular object. Such examples are provided for illustrative purposes and is not to be construed as limiting. It can be appreciated that input data 113 can be retrieved from any service or resource, such as a personal storage resource, such as one provided by a local or remote storage service. In one illustrative example, if a user points at a particular object or expresses one or more gestures indicating an interest in an object, data characterizing such user activity can be analyzed to identify and select a particular object. In yet another example, if a user is communicating through a device, e.g., a phone or IM system, the communication data can be analyzed to identify and select a particular object.

In addition, combinations of different types of input data 113 can be used to identify and select a particular object. For instance, communication data and data identifying a gaze target can be used to identify and select a particular object. Known technologies for analyzing voice, text, images, or other data can be used for deriving keywords or other data that identify an object. These examples are provided for illustrative purposes and are not to be construed as limiting. It can be appreciated that any type of suitable input data 113 can be used to identify and select a particular object and/or an associated controller device 103. Once an object is selected, address information for a computer associated with the selected object can be obtained from one or more resources, including the obtained identification data.

Next, at operation 605, the device module 111 can receive control data 115 and status data 114 related to the selected object. As summarized above, control data 115 can define code, commands or instructions that can be executed by a controller device 103 associated with the selected object. For example, the control data 115 may include commands, code, object code, scripts, a compiled program, an interpreted program, or any other executable set of instructions that can be executed and/or interpreted by a controller device 103 associated with the selected object. The control data 115 can also define communication interfaces, such as an Application Programming Interface (API), for a controller device 103 associated with the selected object.

The status data 114 can include any information related to the selected object or and/or a controller device 103 associated with the selected object. For instance, if the object is a vehicle, the status data can define the state of the engine, tires or any other component of the vehicle. The control data 115 and the status data 114 can be stored in a data structure in memory or any computer readable storage medium for access at a later time. The control data 115 can be received from a service, the controller device 103, and/or another resource. The control data 115 can be provided to the device module 111 or another component of the user device 102 by an initialization process or in response to a request during use of the user device 102.

Next, at operation 607, the device module 111 can cause the display of one or more graphical elements containing content, such as status data and/or one or more selectable control elements. For example, as described above and shown in at least in FIGS. 3B, 4B, and 5B, a user device 102 can cause the display of status data and/or one or more selectable control elements on hardware display surface 118, e.g., an interface, along with a view of the selected object. The view of the selected object can include a rendering of the object or a real-world view of the object viewed through the hardware display surface 118.

In some configurations, the configuration of the selectable control elements can be based, at least in part, on the control data 115 obtained in operation 605. The selectable control elements are configured to enable the generation of a command, also referred to herein as an "input command," which can be communicated to a controller device 103 associated with the selected object. The communication of a particular command can be in response to a selection of a selectable control element associated with the particular command.

As summarized above, graphical elements are configured to show an association between an object and the contents of the graphical elements. For example, a graphical element can be configured to show an association between a view of an object and a display of status data associated with the object. In another example, a graphical element can be configured to show an association between a view of an object and the display of a selectable control element. For illustrative purposes, when an association is made between an object and displayed content, the view of the object is referred to herein as "attached" to display of the displayed content.

As summarize above, the size, shape, color, or any other characteristic of a graphical element or content can be used to show an association between an object displayed content. For example, as shown in FIG. 3B, the shape of a graphical element is used to show an association between a real-world view of an object, the lamp, and display of the contents of the graphical element. In the example shown in FIG. 4B, lines directed from the graphical element are used to show an association between a real-world view of an object, the garage door opener, and the display of the contents of the graphical element. As shown in FIG. 5B and FIG. 5C, arrows are used to show an association between components of an object and the display of the contents of the graphical element.

Operation 607 can also involve one or more actions caused in response to the selection of an object. For instance, communication between two or more devices can be initiated in response to the selection of an object. A notification, which can be an audio signal, a mechanical action, an electrical action, or any suitable graphical display can be caused in response to the selection of an object.

Next, at operation 609, the device module 111 can receive a selection of a control element. For example, as described above and shown in at least in FIGS. 3C, 4C, and 5C, a user device 102 can receive an input from a user 101 indicating the selection of a selectable control element. A sensor 120, which can be a camera, and/or one or more input devices 119, such as a microphone or keypad, can cause the generation of input data 113, which can define any suitable form of user activity, such as a user's gestures, voice commands, gaze direction, etc. The input data 113 can be interpreted by a user device 102 or another device to cause one or more actions, such as the communication of a command associated with the selected control element(s).

At operation 611, the device module 111 communicates one or more commands to the controller device 103 associated with the selected object. In operation 611, the communication of the command can be in response to the selection of at least one selectable control element. The command can be in any suitable format and the command can be communicated using any suitable protocol. In one example, the command can be communicated to an API of the controller device 103. In other examples, the command can be communicated to the controller device 103 using a Web-based protocol or a message-based protocol.

Next, at operation 613, the controller device 103 can execute the command. In the execution of the command, the controller device 103 can cause the selected object to perform one or more actions, change one or more states, and/or communicate data. As shown in the examples above, the controller device 103 can cause a lamp to turn on or off, cause a garage door opener to open or close a door, etc. In addition, the input command can the controller device 103 to perform one or more actions, such as communicate status data and/or update software, etc.

Figure 7:
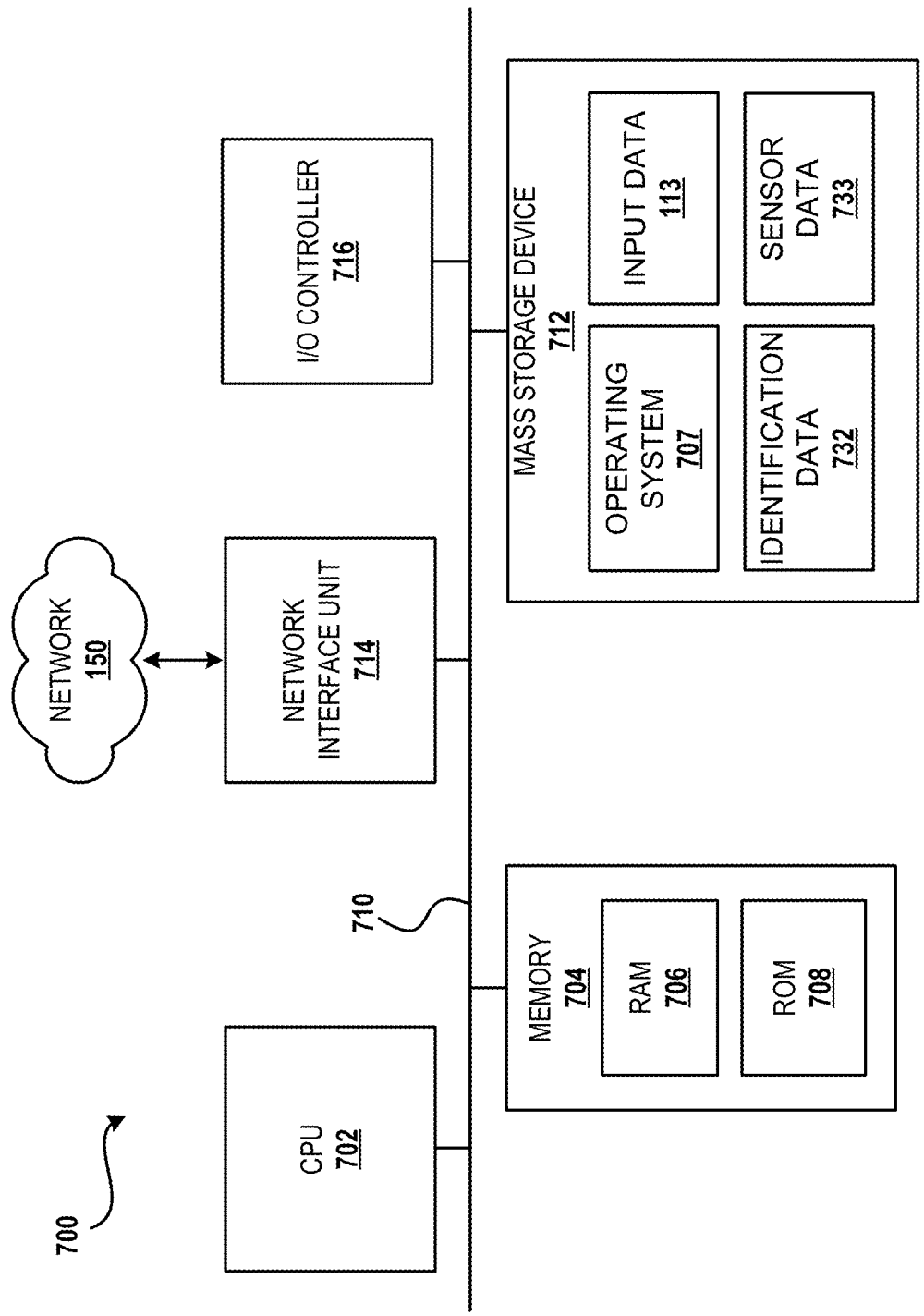
FIG. 7 is a computer architecture diagram illustrating an illustrative computer hardware and software architecture for a computing system capable of implementing aspects of the techniques and technologies presented herein.

FIG. 7 shows additional details of an example computer architecture 700 for a computer, such as the computing devices 103 shown in FIG. 1 and FIG. 2, capable of executing the program components described above for providing a mixed environment display of attached control elements. Thus, the computer architecture 700 illustrated in FIG. 7 illustrates an architecture for a server computer, mobile phone, an HMD, a PDA, a smart phone, a desktop computer, a netbook computer, a tablet computer, and/or a laptop computer. The computer architecture 700 may be utilized to execute any aspects of the software components presented herein.

The computer architecture 700 illustrated in FIG. 7 includes a central processing unit 702 ("CPU"), a system memory 704, including a random access memory 706 ("RAM") and a read-only memory ("ROM") 708, and a system bus 710 that couples the memory 704 to the CPU 702. A basic input/output system containing the basic routines that help to transfer information between elements within the computer architecture 700, such as during startup, is stored in the ROM 708. The computer architecture 700 further includes a mass storage device 77 for storing an operating system 707, and one or more application programs including, but not limited to, input data 113, identification data 732, and sensor data 733.

The mass storage device 712 is connected to the CPU 702 through a mass storage controller (not shown) connected to the bus 710. The mass storage device 712 and its associated computer-readable media provide non-volatile storage for the computer architecture 700. Although the description of computer-readable media contained herein refers to a mass storage device, such as a solid state drive, a hard disk or CD-ROM drive, it should be appreciated by those skilled in the art that computer-readable media can be any available computer storage media or communication media that can be accessed by the computer architecture 700.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, the computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 700. For purposes the claims, the phrase "computer storage medium," "computer-readable storage medium" and variations thereof, does not include waves, signals, and/or other transitory and/or intangible communication media, per se.

According to various configurations, the computer architecture 700 may operate in a networked environment using logical connections to remote computers through the network 150 and/or another network (not shown). The computer architecture 700 may connect to the network 150 through a network interface unit 714 connected to the bus 710. It should be appreciated that the network interface unit 714 also may be utilized to connect to other types of networks and remote computer systems. The computer architecture 700 also may include an input/output controller 716 for receiving and processing input from a number of other devices, including a keyboard, mouse, or electronic stylus (not shown in FIG. 7). Similarly, the input/output controller 716 may provide output to a display screen, a printer, or other type of output device (also not shown in FIG. 7).

It should be appreciated that the software components described herein may, when loaded into the CPU 702 and executed, transform the CPU 702 and the overall computer architecture 700 from a general-purpose computing system into a special-purpose computing system customized to facilitate the functionality presented herein. The CPU 702 may be constructed from any number of transistors or other discrete circuit elements, which may individually or collectively assume any number of states. More specifically, the CPU 702 may operate as a finite-state machine, in response to executable instructions contained within the software modules disclosed herein. These computer-executable instructions may transform the CPU 702 by specifying how the CPU 702 transitions between states, thereby transforming the transistors or other discrete hardware elements constituting the CPU 702.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 700 in order to store and execute the software components presented herein. It also should be appreciated that the computer architecture 700 may include other types of computing devices, including hand-held computers, embedded computer systems, personal digital assistants, and other types of computing devices known to those skilled in the art. It is also contemplated that the computer architecture 700 may not include all of the components shown in FIG. 7, may include other components that are not explicitly shown in FIG. 7, or may utilize an architecture completely different than that shown in FIG. 7.

Figure 8:
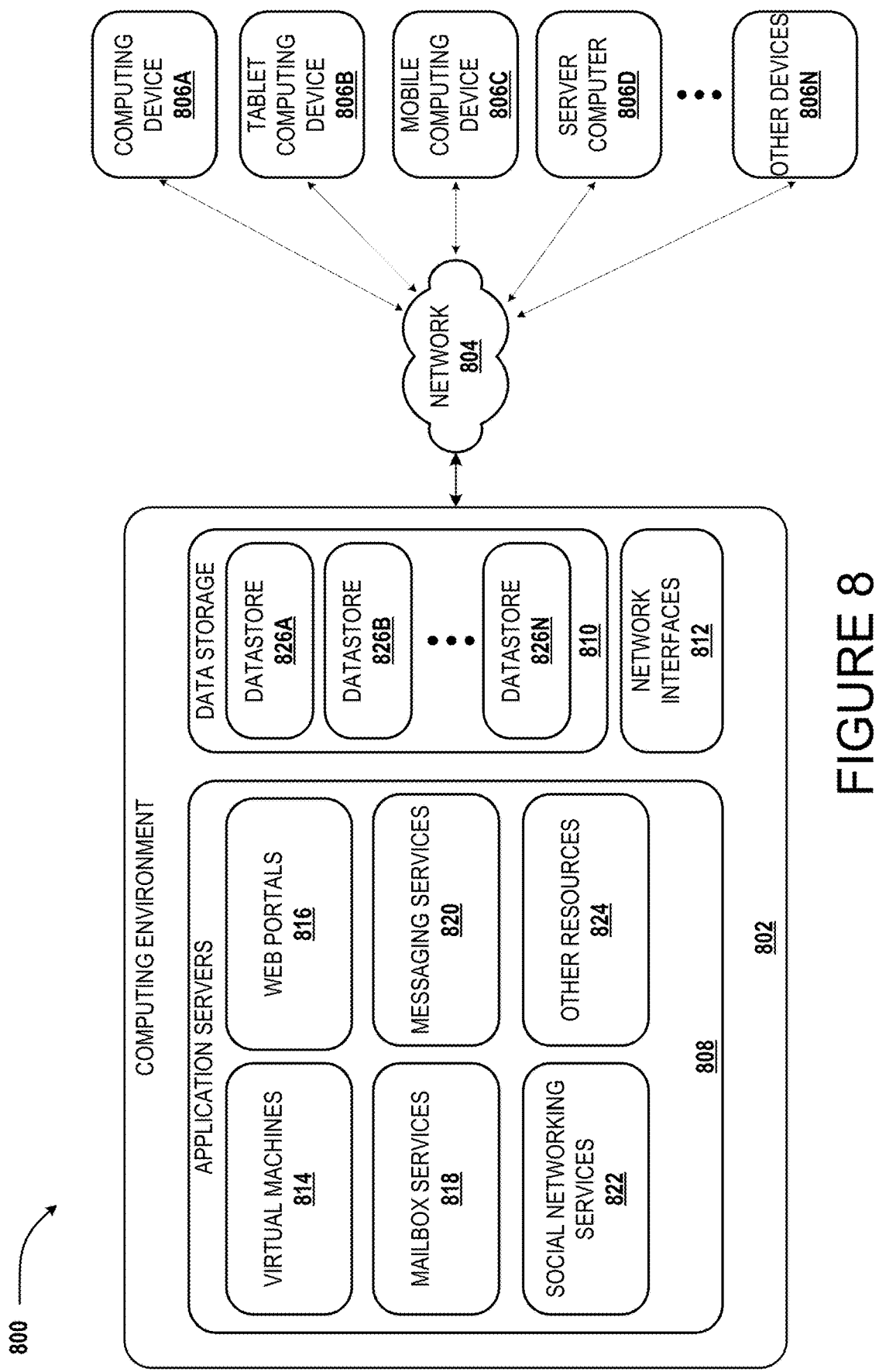
FIG. 8 is a diagram illustrating a distributed computing environment capable of implementing aspects of the techniques and technologies presented herein.

FIG. 8 depicts an illustrative distributed computing environment 800 capable of executing the software components described herein for providing a mixed environment display of attached control elements, among other aspects. Thus, the distributed computing environment 800 illustrated in FIG. 8 can be utilized to execute any aspects of the software components presented herein. For example, the distributed computing environment 800 can be utilized to execute aspects of the techniques disclosed herein.

According to various implementations, the distributed computing environment 800 includes a computing environment 802 operating on, in communication with, or as part of the network 804. The network 804 may be or may include the network 150 described herein with reference to FIG. 1 and the network 956 described herein with reference to FIG. 9. The network 804 also can include various access networks. One or more client devices 806A-806N (hereinafter referred to collectively and/or generically as "clients 806") can communicate with the computing environment 802 via the network 804 and/or other connections (not illustrated in FIG. 8). In one illustrated configuration, the clients 806 include a computing device 806A such as an HMD, a laptop computer, a desktop computer, or other computing device; a slate or tablet computing device ("tablet computing device") 806B; a mobile computing device 806C such as a mobile telephone, a smart phone, or other mobile computing device; a server computer 806D; and/or other devices 806N. It should be understood that any number of clients 806 can communicate with the computing environment 802. It should be understood that the illustrated clients 806 and computing architectures illustrated and described herein are illustrative, and should not be construed as being limited in any way.

In the illustrated configuration, the computing environment 802 includes application servers 808, data storage 810, and one or more network interfaces 812. According to various implementations, the functionality of the application servers 808 can be provided by one or more server computers that are executing as part of, or in communication with, the network 804. The application servers 808 can host various services, virtual machines, portals, and/or other resources. In the illustrated configuration, the application servers 808 host one or more virtual machines 814 for hosting applications or other functionality. According to various implementations, the virtual machines 814 host one or more applications and/or software modules for providing a mixed environment display of attached control elements. It should be understood that this configuration is illustrative, and should not be construed as being limiting in any way. The application servers 808 also host or provide access to one or more portals, link pages, Websites, and/or other information ("Web portals") 816.

According to various implementations, the application servers 808 also include one or more mailbox services 818 and one or more messaging services 820. The mailbox services 818 can include electronic mail ("email") services. The mailbox services 818 also can include various personal information management ("PIM") services including, but not limited to, calendar services, contact management services, collaboration services, and/or other services. The messaging services 820 can include, but are not limited to, instant messaging services, chat services, forum services, and/or other communication services.

The application servers 808 also may include one or more social networking services 822. The social networking services 822 can include various social networking services including, but not limited to, services for sharing or posting status updates, instant messages, links, photos, videos, and/or other information; services for commenting or displaying interest in articles, products, blogs, or other resources; and/or other services. In some configurations, the social networking services 822 are provided by or include the FACEBOOK social networking service, the LINKEDIN professional networking service, the MYSPACE social networking service, the FOURSQUARE geographic networking service, the YAMMER office colleague networking service, and the like. In other configurations, the social networking services 822 are provided by other services, sites, and/or providers that may or may not be explicitly known as social networking providers. For example, some Websites allow users to interact with one another via email, chat services, and/or other means during various activities and/or contexts such as reading published articles, commenting on goods or services, publishing, collaboration, gaming, and the like. Examples of such services include, but are not limited to, the WINDOWS LIVE service and the XBOX LIVE service from Microsoft Corporation in Redmond, Wash. Other services are possible and are contemplated.

The social networking services 822 also can include commenting, blogging, and/or micro blogging services. Examples of such services include, but are not limited to, the YELP commenting service, the KUDZU review service, the OFFICETALK enterprise micro blogging service, the TWITTER messaging service, the GOOGLE BUZZ service, and/or other services. It should be appreciated that the above lists of services are not exhaustive and that numerous additional and/or alternative social networking services 822 are not mentioned herein for the sake of brevity. As such, the above configurations are illustrative, and should not be construed as being limited in any way. According to various implementations, the social networking services 822 may host one or more applications and/or software modules for providing the functionality described herein for providing a mixed environment display of attached control elements. For instance, any one of the application servers 808 may communicate or facilitate the functionality and features described herein. For instance, a social networking application, mail client, messaging client, a browser running on a phone or any other client 806 may communicate with a networking service 822 and facilitate the functionality, even in part, described above with respect to FIG. 6.

As shown in FIG. 8, the application servers 808 also can host other services, applications, portals, and/or other resources ("other resources") 824. The other resources 824 can include, but are not limited to, document sharing, rendering or any other functionality. It thus can be appreciated that the computing environment 802 can provide integration of the concepts and technologies disclosed herein provided herein with various mailbox, messaging, social networking, and/or other services or resources.

As mentioned above, the computing environment 802 can include the data storage 810. According to various implementations, the functionality of the data storage 810 is provided by one or more databases operating on, or in communication with, the network 804. The functionality of the data storage 810 also can be provided by one or more server computers configured to host data for the computing environment 802. The data storage 810 can include, host, or provide one or more real or virtual data stores 826A-826N (hereinafter referred to collectively and/or generically as "data stores 826"). The data stores 826 are configured to host data used or created by the application servers 808 and/or other data. Although not illustrated in FIG. 8, the data stores 826 also can host or store web page documents, word processer documents, presentation documents, data structures, algorithms for execution by a recommendation engine, and/or other data utilized by any application program or another module, such as the content manager 105. Aspects of the data stores 826 may be associated with a service for storing files.

The computing environment 802 can communicate with, or be accessed by, the network interfaces 812. The network interfaces 812 can include various types of network hardware and software for supporting communications between two or more computing devices including, but not limited to, the clients 806 and the application servers 808. It should be appreciated that the network interfaces 812 also may be utilized to connect to other types of networks and/or computer systems.

It should be understood that the distributed computing environment 800 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 800 provides the software functionality described herein as a service to the clients 806. It should be understood that the clients 806 can include real or virtual machines including, but not limited to, server computers, web servers, personal computers, mobile computing devices, smart phones, and/or other devices. As such, various configurations of the concepts and technologies disclosed herein enable any device configured to access the distributed computing environment 800 to utilize the functionality described herein for providing a mixed environment display of attached control elements, among other aspects. In one specific example, as summarized above, techniques described herein may be implemented, at least in part, by the operating system 707 of FIG. 7, which works in conjunction with the application servers 808 of FIG. 8.

Turning now to FIG. 9, an illustrative computing device architecture 900 for a computing device that is capable of executing various software components described herein for providing a mixed environment display of attached control elements. The computing device architecture 900 is applicable to computing devices that facilitate mobile computing due, in part, to form factor, wireless connectivity, and/or battery-powered operation. In some configurations, the computing devices include, but are not limited to, mobile telephones, tablet devices, slate devices, portable video game devices, and the like. The computing device architecture 900 is applicable to any of the clients 806 shown in FIG. 8. Moreover, aspects of the computing device architecture 900 may be applicable to traditional desktop computers, portable computers (e.g., laptops, notebooks, ultra-portables, and netbooks), server computers, and other computer systems, such as those described herein. For example, the single touch and multi-touch aspects disclosed herein below may be applied to desktop computers that utilize a touchscreen or some other touch-enabled device, such as a touch-enabled track pad or touch-enabled mouse.

The computing device architecture 900 illustrated in FIG. 9 includes a processor 902, memory components 904, network connectivity components 906, sensor components 908, input/output components 912, and power components 912. In the illustrated configuration, the processor 902 is in communication with the memory components 904, the network connectivity components 906, the sensor components 908, the input/output ("I/O") components 910, and the power components 912. Although no connections are shown between the individuals components illustrated in FIG. 9, the components can interact to carry out device functions. In some configurations, the components are arranged so as to communicate via one or more busses (not shown).

The processor 902 includes a central processing unit ("CPU") configured to process data, execute computer-executable instructions of one or more application programs, and communicate with other components of the computing device architecture 900 in order to perform various functionality described herein. The processor 902 may be utilized to execute aspects of the software components presented herein and, particularly, those that utilize, at least in part, a touch-enabled input.

In some configurations, the processor 902 includes a graphics processing unit ("GPU") configured to accelerate operations performed by the CPU, including, but not limited to, operations performed by executing general-purpose scientific and/or engineering computing applications, as well as graphics-intensive computing applications such as high resolution video (e.g., 720P, 1030P, and higher resolution), video games, three-dimensional ("3D") modeling applications, and the like. In some configurations, the processor 902 is configured to communicate with a discrete GPU (not shown). In any case, the CPU and GPU may be configured in accordance with a co-processing CPU/GPU computing model, wherein the sequential part of an application executes on the CPU and the computationally-intensive part is accelerated by the GPU.

In some configurations, the processor 902 is, or is included in, a system-on-chip ("SoC") along with one or more of the other components described herein below. For example, the SoC may include the processor 902, a GPU, one or more of the network connectivity components 906, and one or more of the sensor components 908. In some configurations, the processor 902 is fabricated, in part, utilizing a package-on-package ("PoP") integrated circuit packaging technique. The processor 902 may be a single core or multi-core processor.

The processor 902 may be created in accordance with an ARM architecture, available for license from ARM HOLDINGS of Cambridge, United Kingdom. Alternatively, the processor 902 may be created in accordance with an x86 architecture, such as is available from INTEL CORPORATION of Mountain View, Calif. and others. In some configurations, the processor 902 is a SNAPDRAGON SoC, available from QUALCOMM of San Diego, Calif., a TEGRA SoC, available from NVIDIA of Santa Clara, Calif., a HUMMINGBIRD SoC, available from SAMSUNG of Seoul, South Korea, an Open Multimedia Application Platform ("OMAP") SoC, available from TEXAS INSTRUMENTS of Dallas, Tex., a customized version of any of the above SoCs, or a proprietary SoC.

The memory components 904 include a random access memory ("RAM") 914, a read-only memory ("ROM") 916, an integrated storage memory ("integrated storage") 918, and a removable storage memory ("removable storage") 920. In some configurations, the RAM 914 or a portion thereof, the ROM 916 or a portion thereof, and/or some combination the RAM 914 and the ROM 916 is integrated in the processor 902. In some configurations, the ROM 916 is configured to store a firmware, an operating system or a portion thereof (e.g., operating system kernel), and/or a bootloader to load an operating system kernel from the integrated storage 918 and/or the removable storage 920.

The integrated storage 918 can include a solid-state memory, a hard disk, or a combination of solid-state memory and a hard disk. The integrated storage 918 may be soldered or otherwise connected to a logic board upon which the processor 902 and other components described herein also may be connected. As such, the integrated storage 918 is integrated in the computing device. The integrated storage 918 is configured to store an operating system or portions thereof, application programs, data, and other software components described herein.

The removable storage 920 can include a solid-state memory, a hard disk, or a combination of solid-state memory and a hard disk. In some configurations, the removable storage 920 is provided in lieu of the integrated storage 918. In other configurations, the removable storage 920 is provided as additional optional storage. In some configurations, the removable storage 920 is logically combined with the integrated storage 918 such that the total available storage is made available as a total combined storage capacity. In some configurations, the total combined capacity of the integrated storage 918 and the removable storage 920 is shown to a user instead of separate storage capacities for the integrated storage 918 and the removable storage 920.

The removable storage 920 is configured to be inserted into a removable storage memory slot (not shown) or other mechanism by which the removable storage 920 is inserted and secured to facilitate a connection over which the removable storage 920 can communicate with other components of the computing device, such as the processor 902. The removable storage 920 may be embodied in various memory card formats including, but not limited to, PC card, CompactFlash card, memory stick, secure digital ("SD"), miniSD, microSD, universal integrated circuit card ("UICC") (e.g., a subscriber identity module ("SIM") or universal SIM ("USIM")), a proprietary format, or the like.

It can be understood that one or more of the memory components 904 can store an operating system. According to various configurations, the operating system includes, but is not limited to WINDOWS MOBILE OS from Microsoft Corporation of Redmond, Wash., WINDOWS PHONE OS from Microsoft Corporation, WINDOWS from Microsoft Corporation, BLACKBERRY OS from Research In Motion Limited of Waterloo, Ontario, Canada, IOS from Apple Inc. of Cupertino, Calif., and ANDROID OS from Google Inc. of Mountain View, Calif. Other operating systems are contemplated.

The network connectivity components 906 include a wireless wide area network component ("WWAN component") 922, a wireless local area network component ("WLAN component") 924, and a wireless personal area network component ("WPAN component") 926. The network connectivity components 906 facilitate communications to and from the network 956 or another network, which may be a WWAN, a WLAN, or a WPAN. Although only the network 956 is illustrated, the network connectivity components 906 may facilitate simultaneous communication with multiple networks, including the network 956 of FIG. 9. For example, the network connectivity components 906 may facilitate simultaneous communications with multiple networks via one or more of a WWAN, a WLAN, or a WPAN.

The network 956 may be or may include a WWAN, such as a mobile telecommunications network utilizing one or more mobile telecommunications technologies to provide voice and/or data services to a computing device utilizing the computing device architecture 900 via the WWAN component 922. The mobile telecommunications technologies can include, but are not limited to, Global System for Mobile communications ("GSM"), Code Division Multiple Access ("CDMA") ONE, CDMA7000, Universal Mobile Telecommunications System ("UMTS"), Long Term Evolution ("LTE"), and Worldwide Interoperability for Microwave Access ("WiMAX"). Moreover, the network 956 may utilize various channel access methods (which may or may not be used by the aforementioned standards) including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Space Division Multiple Access ("SDMA"), and the like. Data communications may be provided using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and various other current and future wireless data access standards. The network 956 may be configured to provide voice and/or data communications with any combination of the above technologies. The network 956 may be configured to or adapted to provide voice and/or data communications in accordance with future generation technologies.

In some configurations, the WWAN component 922 is configured to provide dual-multi-mode connectivity to the network 956. For example, the WWAN component 922 may be configured to provide connectivity to the network 956, wherein the network 956 provides service via GSM and UMTS technologies, or via some other combination of technologies. Alternatively, multiple WWAN components 922 may be utilized to perform such functionality, and/or provide additional functionality to support other non-compatible technologies (i.e., incapable of being supported by a single WWAN component). The WWAN component 922 may facilitate similar connectivity to multiple networks (e.g., a UMTS network and an LTE network).

The network 956 may be a WLAN operating in accordance with one or more Institute of Electrical and Electronic Engineers ("IEEE") 802.11 standards, such as IEEE 802.11a, 802.11b, 802.11g, 802.11n, and/or future 802.11 standard (referred to herein collectively as WI-FI). Draft 802.11 standards are also contemplated. In some configurations, the WLAN is implemented utilizing one or more wireless WI-FI access points. In some configurations, one or more of the wireless WI-FI access points are another computing device with connectivity to a WWAN that are functioning as a WI-FI hotspot. The WLAN component 924 is configured to connect to the network 956 via the WI-FI access points. Such connections may be secured via various encryption technologies including, but not limited, WI-FI Protected Access ("WPA"), WPA2, Wired Equivalent Privacy ("WEP"), and the like.

The network 956 may be a WPAN operating in accordance with Infrared Data Association ("IrDA"), BLUETOOTH, wireless Universal Serial Bus ("USB"), Z-Wave, ZIGBEE, or some other short-range wireless technology. In some configurations, the WPAN component 926 is configured to facilitate communications with other devices, such as peripherals, computers, or other computing devices via the WPAN.

The sensor components 908 include a magnetometer 928, an ambient light sensor 930, a proximity sensor 932, an accelerometer 934, a gyroscope 936, and a Global Positioning System sensor ("GPS sensor") 938. It is contemplated that other sensors, such as, but not limited to, temperature sensors or shock detection sensors, also may be incorporated in the computing device architecture 900.

The magnetometer 928 is configured to measure the strength and direction of a magnetic field. In some configurations the magnetometer 928 provides measurements to a compass application program stored within one of the memory components 904 in order to provide a user with accurate directions in a frame of reference including the cardinal directions, north, south, east, and west. Similar measurements may be provided to a navigation application program that includes a compass component. Other uses of measurements obtained by the magnetometer 928 are contemplated.

The ambient light sensor 930 is configured to measure ambient light. In some configurations, the ambient light sensor 930 provides measurements to an application program stored within one of the memory components 904 in order to automatically adjust the brightness of a display (described below) to compensate for low-light and high-light environments. Other uses of measurements obtained by the ambient light sensor 930 are contemplated.

The proximity sensor 932 is configured to detect the presence of an object in proximity to the computing device without direct contact. In some configurations, the proximity sensor 932 detects the presence of a user's body (e.g., the user's face) and provides this information to an application program stored within one of the memory components 904 that utilizes the proximity information to enable or disable some functionality of the computing device. For example, a telephone application program may automatically disable a touchscreen (described below) in response to receiving the proximity information so that the user's face does not inadvertently end a call or enable/disable other functionality within the telephone application program during the call. Other uses of proximity as detected by the proximity sensor 932 are contemplated.

The accelerometer 934 is configured to measure proper acceleration. In some configurations, output from the accelerometer 934 is used by an application program as an input mechanism to control some functionality of the application program. For example, the application program may be a video game in which a character, a portion thereof, or an object is moved or otherwise manipulated in response to input received via the accelerometer 934. In some configurations, output from the accelerometer 934 is provided to an application program for use in switching between landscape and portrait modes, calculating coordinate acceleration, or detecting a fall. Other uses of the accelerometer 934 are contemplated.

The gyroscope 936 is configured to measure and maintain orientation. In some configurations, output from the gyroscope 936 is used by an application program as an input mechanism to control some functionality of the application program. For example, the gyroscope 936 can be used for accurate recognition of movement within a 3D environment of a video game application or some other application. In some configurations, an application program utilizes output from the gyroscope 936 and the accelerometer 934 to enhance control of some functionality of the application program. Other uses of the gyroscope 936 are contemplated.

The GPS sensor 938 is configured to receive signals from GPS satellites for use in calculating a location. The location calculated by the GPS sensor 938 may be used by any application program that requires or benefits from location information. For example, the location calculated by the GPS sensor 938 may be used with a navigation application program to provide directions from the location to a destination or directions from the destination to the location. Moreover, the GPS sensor 938 may be used to provide location information to an external location-based service, such as E911 service. The GPS sensor 938 may obtain location information generated via WI-FI, WIMAX, and/or cellular triangulation techniques utilizing one or more of the network connectivity components 906 to aid the GPS sensor 938 in obtaining a location fix. The GPS sensor 938 may also be used in Assisted GPS ("A-GPS") systems.

The I/O components 910 include a display 940, a touchscreen 942, a data I/O interface component ("data I/O") 944, an audio I/O interface component ("audio I/O") 946, a video I/O interface component ("video I/O") 948, and a camera 950. In some configurations, the display 940 and the touchscreen 942 are combined. In some configurations two or more of the data I/O component 944, the audio I/O component 946, and the video I/O component 948 are combined. The I/O components 910 may include discrete processors configured to support the various interface described below, or may include processing functionality built-in to the processor 902.

The display 940 is an output device configured to present information in a visual form. In particular, the display 940 may present graphical user interface ("GUI") elements, text, images, video, notifications, virtual buttons, virtual keyboards, messaging data, Internet content, device status, time, date, calendar data, preferences, map information, location information, and any other information that is capable of being presented in a visual form. In some configurations, the display 940 is a liquid crystal display ("LCD") utilizing any active or passive matrix technology and any backlighting technology (if used). In some configurations, the display 940 is an organic light emitting diode ("OLED") display. Other display types are contemplated.

The touchscreen 942, also referred to herein as a "touch-enabled screen," is an input device configured to detect the presence and location of a touch. The touchscreen 942 may be a resistive touchscreen, a capacitive touchscreen, a surface acoustic wave touchscreen, an infrared touchscreen, an optical imaging touchscreen, a dispersive signal touchscreen, an acoustic pulse recognition touchscreen, or may utilize any other touchscreen technology. In some configurations, the touchscreen 942 is incorporated on top of the display 940 as a transparent layer to enable a user to use one or more touches to interact with objects or other information presented on the display 940. In other configurations, the touchscreen 942 is a touch pad incorporated on a surface of the computing device that does not include the display 940. For example, the computing device may have a touchscreen incorporated on top of the display 940 and a touch pad on a surface opposite the display 940.

In some configurations, the touchscreen 942 is a single-touch touchscreen. In other configurations, the touchscreen 942 is a multi-touch touchscreen. In some configurations, the touchscreen 942 is configured to detect discrete touches, single touch gestures, and/or multi-touch gestures. These are collectively referred to herein as gestures for convenience. Several gestures will now be described. It should be understood that these gestures are illustrative and are not intended to limit the scope of the appended claims. Moreover, the described gestures, additional gestures, and/or alternative gestures may be implemented in software for use with the touchscreen 942. As such, a developer may create gestures that are specific to a particular application program.

In some configurations, the touchscreen 942 supports a tap gesture in which a user taps the touchscreen 942 once on an item presented on the display 940. The tap gesture may be used for various reasons including, but not limited to, opening or launching whatever the user taps. In some configurations, the touchscreen 942 supports a double tap gesture in which a user taps the touchscreen 942 twice on an item presented on the display 940. The double tap gesture may be used for various reasons including, but not limited to, zooming in or zooming out in stages. In some configurations, the touchscreen 942 supports a tap and hold gesture in which a user taps the touchscreen 942 and maintains contact for at least a pre-defined time. The tap and hold gesture may be used for various reasons including, but not limited to, opening a context-specific menu.

In some configurations, the touchscreen 942 supports a pan gesture in which a user places a finger on the touchscreen 942 and maintains contact with the touchscreen 942 while moving the finger on the touchscreen 942. The pan gesture may be used for various reasons including, but not limited to, moving through screens, images, or menus at a controlled rate. Multiple finger pan gestures are also contemplated. In some configurations, the touchscreen 942 supports a flick gesture in which a user swipes a finger in the direction the user wants the screen to move. The flick gesture may be used for various reasons including, but not limited to, scrolling horizontally or vertically through menus or pages. In some configurations, the touchscreen 942 supports a pinch and stretch gesture in which a user makes a pinching motion with two fingers (e.g., thumb and forefinger) on the touchscreen 942 or moves the two fingers apart. The pinch and stretch gesture may be used for various reasons including, but not limited to, zooming gradually in or out of a website, map, or picture.

Although the above gestures have been described with reference to the use one or more fingers for performing the gestures, other appendages such as toes or objects such as styluses may be used to interact with the touchscreen 942. As such, the above gestures should be understood as being illustrative and should not be construed as being limiting in any way.

The data I/O interface component 944 is configured to facilitate input of data to the computing device and output of data from the computing device. In some configurations, the data I/O interface component 944 includes a connector configured to provide wired connectivity between the computing device and a computer system, for example, for synchronization operation purposes. The connector may be a proprietary connector or a standardized connector such as USB, micro-USB, mini-USB, or the like. In some configurations, the connector is a dock connector for docking the computing device with another device such as a docking station, audio device (e.g., a digital music player), or video device.

The audio I/O interface component 946 is configured to provide audio input and/or output capabilities to the computing device. In some configurations, the audio I/O interface component 946 includes a microphone configured to collect audio signals. In some configurations, the audio I/O interface component 946 includes a headphone jack configured to provide connectivity for headphones or other external speakers. In some configurations, the audio I/O interface component 946 includes a speaker for the output of audio signals. In some configurations, the audio I/O interface component 946 includes an optical audio cable out.

The video I/O interface component 948 is configured to provide video input and/or output capabilities to the computing device. In some configurations, the video I/O interface component 948 includes a video connector configured to receive video as input from another device (e.g., a video media player such as a DVD or BLURAY player) or send video as output to another device (e.g., a monitor, a television, or some other external display). In some configurations, the video I/O interface component 948 includes a High-Definition Multimedia Interface ("HDMI"), mini-HDMI, micro-HDMI, DisplayPort, or proprietary connector to input/output video content. In some configurations, the video I/O interface component 948 or portions thereof is combined with the audio I/O interface component 946 or portions thereof.

The camera 950 can be configured to capture still images and/or video. The camera 950 may utilize a charge coupled device ("CCD") or a complementary metal oxide semiconductor ("CMOS") image sensor to capture images. In some configurations, the camera 950 includes a flash to aid in taking pictures in low-light environments. Settings for the camera 950 may be implemented as hardware or software buttons.

Although not illustrated, one or more hardware buttons may also be included in the computing device architecture 900. The hardware buttons may be used for controlling some operational aspect of the computing device. The hardware buttons may be dedicated buttons or multi-use buttons. The hardware buttons may be mechanical or sensor-based.

The illustrated power components 914 include one or more batteries 952, which can be connected to a battery gauge 954. The batteries 952 may be rechargeable or disposable. Rechargeable battery types include, but are not limited to, lithium polymer, lithium ion, nickel cadmium, and nickel metal hydride. Each of the batteries 952 may be made of one or more cells.

The battery gauge 954 can be configured to measure battery parameters such as current, voltage, and temperature. In some configurations, the battery gauge 954 is configured to measure the effect of a battery's discharge rate, temperature, age and other factors to predict remaining life within a certain percentage of error. In some configurations, the battery gauge 954 provides measurements to an application program that is configured to utilize the measurements to present useful power management data to a user. Power management data may include one or more of a percentage of battery used, a percentage of battery remaining, a battery condition, a remaining time, a remaining capacity (e.g., in watt hours), a current draw, and a voltage.

The power components 912 may also include a power connector, which may be combined with one or more of the aforementioned I/O components 910. The power components 912 may interface with an external power system or charging equipment via an I/O component.

The disclosure presented herein may be considered in view of the following clauses.

Clause A: A first computing device, comprising: a processor; a hardware display surface; one or more input devices; a memory having computer-executable instructions stored thereupon which, when executed by the processor, cause the first computing device to obtain control data defining one or more commands configured to cause an execution of a second set of computer-executable instructions at a second computing device, wherein the second computing device is configured to interact with an object, obtain status data indicating a status associated with the second computing device or the object, cause a display of one or more graphical elements comprising the status data and the one or more commands on the hardware display surface, wherein the hardware display surface is configured to display the one or more graphical elements with a real-world view of the object through a transparent section of the hardware display surface, and communicate the one or more commands to the second computing device in response to a selection of the one or more commands detected by the one or more input devices, wherein the communication of the one or more commands causes an execution of at least a portion of the second set of computer-executable instructions at the second computing device.

Clause B: The computing device of Clause A, wherein the execution of at least the portion of the second set of computer-executable instructions at the second computing device controls at least one component of the object.

Clause C: The computing device of Clauses A-B, wherein the computer-executable instructions further cause the first computing device to: obtain identification data indicating an association between an address of the second computing device and at least one physical characteristic of the object; analyze image data from the one or more input devices to generate data defining an identified physical characteristic of the object; select the object based, at least in part, on the data defining the identified physical characteristic of the object and the identification data indicating the at least one physical characteristic of the object; and initiate a communication connection with the second computing device in response to the selection of the object, wherein the communication connection is established by the use of the address of the second computing device.

Clause D: The computing device of Clauses A-C, wherein the computer-executable instructions further cause the first computing device to: obtain identification data indicating an association between an address of the second computing device and at least one physical characteristic of the object; analyze image data from the one or more input devices to generate data defining an identified physical characteristic of the object; select the object based, at least in part, on the data defining the identified physical characteristic of the object and the identification data indicating the at least one physical characteristic of the object; and communicate a request for the control data to the second computing device in response to the selection of the object, wherein the request is communicated by the use of the address of the second computing device.

Clause E: The computing device of Clauses A-D, wherein the computer-executable instructions further cause the first computing device to: receive data defining a location of the second computing device; receive data defining a location of the first computing device; receive gaze direction data defining a direction of a field of view of the hardware display surface; and select the object based, at least in part, on the data defining the location of the second computing device, the data defining the location of the first computing device, and the gaze direction data, and wherein the display of the one or more graphical elements is caused in response to the selection of the object.

Clause F: The computing device of Clauses A-E, wherein the computer-executable instructions further cause the first computing device to determine if the gaze direction data indicates that the field of view is directed toward the object, and wherein the second computing device is selected if the gaze direction data indicates that the field of view is directed toward the object.

Clause G: The computing device of Clauses A-F, wherein the computer-executable instructions further cause the first computing device to: determine if the first computing device is within a predetermined distance from the second computing device; and select the object if the data defining the location of the second computing device and the data defining the location of the first computing device indicate that the first computing device is within the predetermined distance from the second computing device, and wherein the display of the one or more graphical elements is caused in response to the selection of the object.

Clause H: The computing device of Clauses A-G, wherein the selection of the one or more commands detected by the one or more input devices comprises an input signal indicating the selection, wherein the signal is caused by at least one of a voice command, a gesture command, and a key input command.

Clause I: A computer-implemented method, comprising: obtaining, at a first computing device, control data defining one or more commands configured to cause an execution of a second set of computer-executable instructions at a second computing device, wherein the second computing device is configured to interact with an object, causing a display of one or more graphical elements comprising the one or more commands on the hardware display surface, wherein the hardware display surface is configured to display the one or more graphical elements with a real-world view of the object through a transparent section of the hardware display surface, and communicating the one or more commands from the first computing device to the second computing device in response to a selection of the one or more commands detected by the one or more input devices, wherein the communication of the one or more commands causes an execution of at least a portion of the second set of computer-executable instructions at the second computing device.

Clause J: The computer-implemented method of Clause I, wherein the one or more graphical elements are configured to indicate an association between the real-world view of the object and the display of the one or more graphical elements comprising the one or more commands.

Clause K: The computer-implemented method of Clauses I-J, wherein the one or more graphical elements are configured to indicate an association between a rendering of a component of object and the display of the one or more graphical elements comprising the one or more commands.

Clause L: The computer-implemented method of Clauses I-K, further comprising, in response to the selection of the one or more commands, causing a modification of the one or more graphical elements to indicate an association between a real-world view of a component of the object and the display of the one or more graphical elements comprising the one or more commands.

Clause M: The computer-implemented method of Clauses I-L, further comprising, in response to the selection of the one or more commands, causing a modification of the one or more graphical elements to indicate an association between the real-world view of the object and the display of the one or more graphical elements comprising the one or more commands.

Clause N: A first computing device, comprising: a processor; a hardware display surface; one or more input devices; a memory having computer-executable instructions stored thereupon which, when executed by the processor, cause the first computing device to obtain control data defining one or more commands configured to cause an execution of a second set of computer-executable instructions at one or more controller devices, wherein the one or more controller devices are configured to interact with one or more objects, cause a display of one or more graphical elements comprising the one or more commands on the hardware display surface, wherein the display further comprises a rendering of the one or more controller devices or a rendering of the one or more objects, and communicate the one or more commands to the one or more controller devices in response to a selection of the one or more commands detected by the one or more input devices, wherein the communication of the one or more commands causes an execution of at least a portion of the second set of computer-executable instructions at the one or more controller devices.

Clause O: The computer-implemented method of Clause N, wherein the execution of at least the portion of the second set of computer-executable instructions at the one or more controller devices controls at least one component of the one or more objects.

Clause P: The computer-implemented method of Clauses N-O, wherein the computer-executable instructions further cause the first computing device to: obtain identification data indicating an association between an address of the one or more controller devices and at least one physical characteristic of the one or more objects; analyze image data from the one or more input devices to generate data defining an identified physical characteristic of the one or more objects; select the one or more objects based, at least in part, on the data defining the identified physical characteristic of the one or more objects and the identification data indicating the at least one physical characteristic of the one or more objects, wherein the display of the one or more graphical elements is caused in response to the selection of the one or more objects, and wherein the communication of the one or more commands is based, at least in part, on the address.

Clause Q: The computer-implemented method of Clauses N-P, wherein the computer-executable instructions further cause the first computing device to: obtain identification data indicating an association between an address of the one or more controller devices and at least one physical characteristic of the one or more objects; analyze image data from the one or more input devices to generate data defining an identified physical characteristic of the one or more objects; select the one or more objects based, at least in part, on the data defining the identified physical characteristic of the one or more objects and the identification data indicating the at least one physical characteristic of the one or more objects, wherein the display of the one or more graphical elements is caused in response to the selection of the one or more objects, and wherein the communication of the one or more commands is based, at least in part, on the address.

Clause R: The computer-implemented method of Clauses N-Q: wherein the computer-executable instructions further cause the first computing device to: receive data defining a location of the one or more objects; receive data defining a location of the first computing device; receive gaze direction data defining a direction of a field of view of the hardware display surface; and select the one or more objects based, at least in part, on the data defining the location of the one or more objects, the data defining the location of the first computing device, and the gaze direction data, and wherein the display of the one or more graphical elements is caused in response to the selection of the one or more objects.

Clause S: The computer-implemented method of Clauses N-R, wherein the computer-executable instructions further cause the first computing device to utilize data caused by the one or more input sensors to determine if the gaze direction data indicates that the field of view is directed toward the one or more objects, and wherein the one or more objects is selected if the gaze direction data indicates that the field of view is directed toward the one or more objects.

Clause T: The computer-implemented method of Clauses N-S, wherein the computer-executable instructions further cause the first computing device to:
determine if the first computing device is within a predetermined distance from the one or more objects; and select the one or more objects if the data defining the location of the one or more objects and the data defining the location of the first computing device indicate that the first computing device is within the predetermined distance from the one or more objects, and wherein the display of the one or more graphical elements is caused in response to the selection of the one or more objects.

Based on the foregoing, it should be appreciated that concepts and technologies have been disclosed herein that provide, among other techniques, a mixed environment display of attached control elements. Although the subject matter presented herein has been described in language specific to computer structural features, methodological and transformative acts, specific computing machinery, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example configurations and applications illustrated and described, and without departing from the true spirit and scope of the present invention, which is set forth in the following claims.

What is claimed is:

1. A computer-implemented method, comprising:
   obtaining, at a first computing device, control data defining one or more commands configured to cause an execution of a set of computer-executable instructions at a second computing device configured to interact with an object;
   analyzing image data from one or more input devices to identify a physical characteristic of the object;
   obtaining identification data indicating an association between a network address of the second computing device and the physical characteristic of the object;
   establishing a connection with the second computing device using the network address in response to identifying the physical characteristic of the object;
   obtaining status data indicating a status associated with the second computing device or the object;
   causing a display of one or more graphical elements comprising the status data and the one or more commands on a hardware display surface of the first computing device, wherein the hardware display surface is configured to display the one or more graphical elements with a real-world view of the object through a transparent section of the hardware display surface;
   capturing a gesture of at least a portion of a hand, performed by a user, wherein the gesture is viewable by the user through the transparent section of the hardware display surface, and wherein the gesture is viewable with the real-world view of the object by the user;
   selecting the one or more graphical elements based on the gesture; and
   communicating the one or more commands to the second computing device in response to the gesture indicating the selection of the one or more graphical elements detected by the one or more input devices, wherein the communication of the one or more commands causes an execution of at least a portion of the set of computer-executable instructions at the second computing device.

2. The computer-implemented method of claim 1, wherein the execution of at least the portion of the set of computer-executable instructions at the second computing device controls at least one component of the object.

3. The computer-implemented method of claim 1, further comprising: selecting the object based, at least in part, on the gesture; and initiating the connection in response to the gesture.

4. The computer-implemented method of claim 1, further comprising: selecting the object based, at least in part, on data defining the identified physical characteristic of the object; and communicating a request for the control data to the second computing device in response to the selection of the object, wherein the request is communicated by the use of the network address of the second computing device.

5. The computer-implemented method of claim 1, further comprising: receiving data defining a location of the second computing device; receiving data defining a location of the first computing device; receiving gaze direction data defining a direction of a field of view of the hardware display surface; and selecting the object based, at least in part, on the data defining the location of the second computing device, the data defining the location of the first computing device, and the gaze direction data, and wherein the display of the one or more graphical elements is caused in response to the selection of the object.

6. The computer-implemented method of claim 5, further comprising: determining if the gaze direction data indicates that the field of view is directed toward the object, and wherein the second computing device is selected if the gaze direction data indicates that the field of view is directed toward the object.

7. The computer-implemented method of claim 5, further comprising: determining if the first computing device is within a predetermined distance from the second computing device; and selecting the object if the data defining the location of the second computing device and the data defining the location of the first computing device indicate that the first computing device is within the predetermined distance from the second computing device.

8. The computer-implemented method of claim 1, wherein the communication of the one or more commands comprises interpreting an input signal indicating the selection of the one or more commands, wherein the signal is caused by at least one of a voice command, a gesture command, and a key input command.

9. A first computing device, comprising:
   a processor;
   a hardware display surface;
   one or more input devices;
   a memory having a first set of computer-executable instructions stored thereupon which, when executed by the processor, cause the first computing device to
   obtain control data defining one or more commands configured to cause an execution of a second set of computer-executable instructions at a second computing device, wherein the second computing device is configured to interact with an object,
   analyze image data from the one or more input devices to identify a physical characteristic of the object,
   obtain identification data indicating an association between a network address of the second computing device and the physical characteristic of the object,
   establish a connection with the second computing device using the network address in response to identifying the physical characteristic of the object,
   cause a display of one or more graphical elements comprising the one or more commands on the hardware display surface, wherein the hardware display surface is configured to display the one or more graphical elements with a real-world view of the object through a transparent section of the hardware display surface,
   capture, at the one or more input devices, a gesture of at least a portion of a hand, performed by a user, wherein the gesture is viewable by the user through the hardware display surface, and wherein the gesture is viewable by the user with the real-world view of the object,
select at least one of the one or more graphical elements based on the gesture, and
communicate the one or more commands from the first computing device to the second computing device in response to the selection of the at least one of the one or more graphical elements detected by the one or more input devices, wherein the communication of the one or more commands causes an execution of at least a portion of the second set of computer-executable instructions at the second computing device.

10. The first computing device of claim 9, wherein the one or more graphical elements are configured to indicate an association between the real-world view of the object and the display of the one or more graphical elements comprising the one or more commands.

11. The first computing device of claim 9, wherein the one or more graphical elements are configured to indicate an association between a rendering of a component of the object and the display of the one or more graphical elements comprising the one or more commands.

12. The first computing device of claim 9, wherein the first set of computer-executable instructions further cause the first computing device to, in response to the selection of the at least one of the one or more graphical elements, cause a modification of the one or more graphical elements to indicate an association between a real-world view of a component of the object and the display of the one or more graphical elements comprising the one or more commands.

13. The first computing device of claim 9, wherein the first set of computer-executable instructions further cause the first computing device to, in response to the selection of the at least one of the one or more graphical elements, cause a modification of the one or more graphical elements to indicate an association between the real-world view of the object and the display of the one or more graphical elements.

14. A computer-implemented method, comprising:
obtaining control data, at a computing device, defining one or more commands configured to cause an execution of a set of computer-executable instructions at one or more controller devices configured to interact with one or more objects;
analyzing image data from one or more input devices to identify a physical characteristic of the one or more objects;
obtaining identification data indicating an association between a network address of the one or more controller devices and the physical characteristic of the one or more objects;
establishing a connection with the one or more controller devices using the network address in response to identifying the physical characteristic of the one or more objects;
causing a display of one or more graphical elements comprising the one or more commands on a hardware display surface of the computing device, wherein the display further comprises a rendering of the one or more objects;
capturing a gesture performed by a user, wherein the gesture is viewable by the user through a transparent section of the hardware display surface, and wherein the gesture is viewable by the user with the rendering of the one or more objects;
selecting the one or more graphical elements based on the gesture; and
communicating the one or more commands to the one or more controller devices in response to the selection of the one or more graphical elements, wherein the communication of the one or more commands causes an execution of at least a portion of the set of computer-executable instructions at the one or more controller devices.

15. The computer-implemented method of claim 14, wherein the execution of at least the portion of the set of computer-executable instructions at the one or more controller devices controls at least one component of the one or more objects.

16. The computer-implemented method of claim 15, further comprising: selecting the one or more objects based, at least in part, on data defining the identified physical characteristic of the one or more objects, wherein the display of the one or more graphical elements is caused in response to the selection of the one or more objects, and wherein the communication of the one or more commands uses the network address.

17. The computer-implemented method of claim 14, further comprising: selecting the one or more objects based, at least in part, on data defining the identified physical characteristic of the one or more objects, wherein the display of the one or more graphical elements is caused in response to the selection of the one or more objects, and wherein the communication of the one or more commands is based, at least in part, on the network address.

18. The computer-implemented method of claim 14, further comprising: receiving data defining a location of the one or more objects; receiving data defining a location of the computing device; receiving gaze direction data defining a direction of a field of view of the hardware display surface: and selecting the one or more objects based, at least in part, on the data defining the location of the one or more objects, the data defining the location of the computing device, and the gaze direction data, and wherein the display of the one or more graphical elements is caused in response to the selection of the one or more objects.

19. The computer-implemented method of claim 18, wherein the method further comprises determining if the gaze direction data indicates that the field of view is directed toward the one or more objects, and wherein the one or more objects is selected if the gaze direction data indicates that the field of view is directed toward the one or more objects.

20. The computer-implemented method of claim 18, further comprising: determining if the computing device is within a predetermined distance from the one or more objects; and selecting the one or more objects if the data defining the location of the one or more objects and the data defining the location of the computing device indicate that the computing device is within the predetermined distance from the one or more objects.

* * * * *